(12) United States Patent
Ichikawa

(10) Patent No.: US 10,050,474 B2
(45) Date of Patent: Aug. 14, 2018

(54) NON-CONTACT POWER TRANSMISSION SYSTEM, RECEIVING APPARATUS AND TRANSMITTING APPARATUS

(71) Applicant: Hitachi Maxell, Ltd., Ibaraki-shi, Osaka (JP)

(72) Inventor: Katsuei Ichikawa, Yokohama (JP)

(73) Assignee: MAXELL, LTD., Kyoto (JP)

( * ) Notice: Subject to any disclaimer, the term of this patent is extended or adjusted under 35 U.S.C. 154(b) by 307 days.

(21) Appl. No.: 14/874,086

(22) Filed: Oct. 2, 2015

(65) Prior Publication Data

US 2016/0028244 A1 Jan. 28, 2016

Related U.S. Application Data

(63) Continuation of application No. 13/417,716, filed on Mar. 12, 2012, now Pat. No. 9,154,003.

(30) Foreign Application Priority Data

Mar. 16, 2011 (JP) .................. 2011-057375

(51) Int. Cl.
*H01F 38/14* (2006.01)
*H01F 37/00* (2006.01)
(Continued)

(52) U.S. Cl.
CPC .............. *H02J 50/12* (2016.02); *H02J 5/005* (2013.01); *H02J 7/0021* (2013.01); *H02J 7/025* (2013.01);
(Continued)

(58) Field of Classification Search
CPC .. H02J 7/0021; H02J 2007/0001; H02J 5/025; H02J 7/025; H02J 17/00;
(Continued)

(56) References Cited

U.S. PATENT DOCUMENTS 8,643,219 B2 2/2014 Yabe et al.
8,729,735 B2 5/2014 Urano
(Continued)

FOREIGN PATENT DOCUMENTS

EP 1777836 A1 4/2007
JP 03-098432 A 4/1991
(Continued)

OTHER PUBLICATIONS

T. Miyamoto et al., "Wireless Power Transfer System with a Simple Receiver Coil", IMWS-IWPT2011 Proceedings, pp. 131-134, 2011.
(Continued)

*Primary Examiner* — Hal Kaplan
(74) *Attorney, Agent, or Firm* — McDermott Will & Emery LLP

(57) ABSTRACT

A non-contact power transmission system comprises: a primary coil including a power supply coil and a magnetic resonance coil; and a secondary coil including a load coil, thereby transmitting an electric power from the power supply coil at a self-resonating frequency of the magnetic resonance coil, which is determined by a parasitic capacitance between wound wires of the coil and a self inductance of the coil, and taking out the electric power supplied, from the load coil of the secondary coil through magnetic coupling, with non-contact, wherein the electric power is transmitted, with non-contact, with applying magnetic coupling in coupling between the power supply coil and the magnetic resonance coil and coupling between the magnetic resonance coil and the load coil.

16 Claims, 22 Drawing Sheets

(51) Int. Cl.

| | | |
|---|---|---|
| *H04B 5/00* | (2006.01) | |
| *H02J 50/12* | (2016.01) | |
| *H02J 50/80* | (2016.01) | |
| *H02J 50/40* | (2016.01) | |
| *H02J 5/00* | (2016.01) | |
| *H02J 7/00* | (2006.01) | |
| *H02J 7/02* | (2016.01) | |
| *H02J 17/00* | (2006.01) | |

(52) U.S. Cl.
CPC .............. *H02J 17/00* (2013.01); *H02J 50/40* (2016.02); *H02J 50/80* (2016.02); *H04B 5/0025* (2013.01); *H04B 5/0031* (2013.01); *H04B 5/0037* (2013.01); *H04B 5/0075* (2013.01); *H04B 5/0081* (2013.01); *H04B 5/0087* (2013.01); *H04B 5/0093* (2013.01); *H02J 2007/0001* (2013.01); *Y02T 10/7055* (2013.01)

(58) Field of Classification Search
CPC .............. Y02T 10/7055; Y02T 90/122; H04B 5/0025–5/0093; B60L 11/182; B60L 11/1829–11/1831; H01F 38/14; H01F 2038/143–2038/146; A61B 1/00029; A61N 1/3787
USPC .......................................... 307/104; 320/108
See application file for complete search history.

(56) References Cited

U.S. PATENT DOCUMENTS

| | | |
|---|---|---|
| 2006/0287763 A1 | 12/2006 | Ochi et al. |
| 2009/0085408 A1 | 4/2009 | Bruhn |
| 2010/0164295 A1 | 7/2010 | Ichikawa et al. |
| 2011/0018358 A1 | 1/2011 | Kozakai |
| 2011/0043050 A1 | 2/2011 | Yabe et al. |
| 2011/0163609 A1 | 7/2011 | Wada et al. |
| 2011/0241440 A1 | 10/2011 | Sakoda et al. |
| 2012/0001485 A1 | 1/2012 | Uchida |
| 2012/0098330 A1 | 4/2012 | Ichikawa et al. |

FOREIGN PATENT DOCUMENTS

| | | |
|---|---|---|
| JP | 10-283447 | 10/1998 |
| JP | 2001-076111 A | 3/2001 |
| JP | 2001-307032 A | 11/2001 |
| JP | 2006-353042 A | 12/2006 |
| JP | 2009111977 A | 5/2009 |
| JP | 2009284657 A | 12/2009 |
| JP | 2010098878 A | 4/2010 |
| JP | 2010116441 A | 5/2010 |
| JP | 2010-141976 A | 6/2010 |
| JP | 2010154700 A | 7/2010 |
| JP | 2011029799 A | 2/2011 |
| JP | 2011142748 A | 7/2011 |
| WO | 2011/001524 A1 | 1/2011 |
| WO | 2011016411 A1 | 2/2011 |

OTHER PUBLICATIONS

Nikkei Business, Jan. 26, 2009, pp. 78, Nikkei BP company.
Nikkei Electronics, Dec. 3, 2007, pp. 117-0128.
Office Action Japanese Patent Application No. 2011-057375 dated Aug. 26, 2014.
Non-Final Office Action U.S. Appl. No. 13/417,716 dated Dec. 11, 2014.
Notice of Allowance U.S. Appl. No. 13/417,716 dated Jun. 5, 2015.
Office Action dated May 3, 2017 in Chinese Patent Application No. 201510724610.0, with English language tanslation.

FREQUENCY CHARACTERISTICS (GRAPH) OF
12TH EMBODIMENT OF NON-CONTACT POWER
TRANSMISSION SYSTEM SHOWN IN FIG. 16A

FREQUENCY CHARACTERISTICS (GRAPH) OF
13TH EMBODIMENT OF NON-CONTACT POWER
TRANSMISSION SYSTEM SHOWN IN FIG. 17

NON-CONTACT POWER TRANSMISSION SYSTEM, RECEIVING APPARATUS AND TRANSMITTING APPARATUS

This application is a Continuation Application of U.S. Ser. No. 13/417,716 filed Mar. 12, 2012, which claims priority from Japanese Patent Application No. 2011-057375 filed on Mar. 16, 2011. The subject matter of each is incorporated herein by reference in entirety.

BACKGROUND OF THE INVENTION

The present invention relates to a non-contact (or contactless) data communication means and a non-contact power transmitting means applying a magnetic resonance therein, and an apparatus and an antenna for transmitting between those, and it relates to an effective technology to be applied to an apparatus for charging mobile equipments, which mount a non-contact IC card and/or a battery therein, in contactless (inductively).

As the technology, upon which the inventors of the present invention studied, in relation to the conventional technology of the non-contact power charging system, there can be considered one having such structure as shown in FIG. 24, as one example thereof, for example.

FIG. 24 is a block diagram for showing one example of the conventional technology of a charging system through induction (i.e., without contact), and the system shown in the figure is so constructed that it includes a power transmitting apparatus 701, which is provided on a power supplier side, such as, a station of a railway or a shop, etc, and a mobile or portable terminal device 702, which is carried by a user. In the present system, the portable terminal device 702 is charged by the power transmitting apparatus 701.

The power transmitting apparatus 701 is so constructed that it includes a non-contact type processor module 713, such as, a RFID reader, etc., a non-contact type power transmitter module 712, and a power transmission controller module 711.

The portable terminal device 702 is so constructed that it includes a non-contact type processor module 723 for non-contact type process operations of the RFID, etc., a non-contact type power receiver module 722, a power receiving controller module 721 for conducting determination of charge and control, and a large capacitive storage module 720 for enabling charging at high speed.

In the structure shown in the figure, during when the user owning the portable terminal 702 executes data transmission, for conducting an electronic funds transfer, etc., between the non-contact type processor module 713, which is mounted on the power transmitting apparatus 701 provided in the station or the shop, etc., and the non-contact type processor module 723, which is mounted on the portable terminal 702, an electric power is transmitted, inductively (in the con-contact manner), from the non-contact type power transmitter module 712 to the non-contact type power receiver module 722 on the terminal side, while at the same time, on the non-contact type power receiver module 722, the electric power received is rectified to be charged into the high-speed large capacitive storage module 720, and within the power transmission controller module 711 and the power receiving controller module 721, a control is made on the inductive (non-contact) power transmission between those modules and a control is made on charging to the high-speed large capacitive storage module 720.

With such structure as was mentioned above, because of such structure that charging of a power source of the portable terminal device 702 during when communication is made between the non-contact type processor modules 713 and 723, it is possible to reduce the charging time for the portable terminal device 702, and further if the communication is made between the non-contact type processor modules 713 and 723, frequently, it is also possible to use the terminal, continuously, even if not charging the portable terminal device 702, in particular (for example, please refer the Patent Document 1).

Further, in the electric power transmission shown in FIG. 24, it is common to apply transmission through a magnetic coupling, such as, an electromagnetic induction method or a magnetic resonance method, etc., for non-contact communication and/or non-contact power transmission at a relatively short distance, such as, several centimeters or less than that. This is because strength or intensity of transmission through the electromagnetic coupling is in inverse preposition to a square of distance "r" of transmission, on the contrary to the fact that it is in inverse preposition to the distance "r" of transmission with the transmitting method through an electric or radio wave, which can be considered to be effective as other transmitting method, and for example, a term of 1/(r2) is larger than 1/r when transmission distance is less than 1 meter.

For this reason, the frequency of the radio wave to be applied in non-contact transmission for the communication and the charging is in a band from 100 kHz to 10 and several MHz, approximately, and it is common that as an antenna for use of that sending/receiving is applied such an antenna, as shown in FIG. 25, i.e., a coil-like antenna having several turns to several tens turns, for strengthening the magnetic coupling, and therefore, such a coil-like antenna, having a diameter of 4 cm is applied in the transmission of the non-contact communication and the non-contact electric power transmission to be applied in the portable terminal, as shown in FIG. 24 (for example, please refer the Non-Patent Document 1).

As other technology, upon which the inventors study, is already known that, which is described in the Non-Patent Document 2 and the Patent Document 2. In relation to this non-contact electric power transmitting system, there can be considered such structure, as shown in FIG. 26, for example.

FIG. 26 shows the structure of an example of the conventional technology of the non-contact electric power transmitting system, wherein the non-contact electric power transmitting system 730 comprises a high-frequency power source 731, in which a primary coil is made up with a power supply coil 732, being connected with the high-frequency power source 731 through a variable impedance 737, and a resonance coil 733, and a secondary coil is made up with a resonance coil 734 and a load coil 735, and further a load 736 connected with the load coil 735.

Further, with the resonance coils 733 and 734 are connected resonance capacitors 738 and 739, respectively, wherein the power supply coil 732, the resonance coils 733 734 and the load coil 735 builds up a resonance system 740. Also, as an output frequency of the high-frequency power source 731, a resonating frequency of the resonance system 740 is determined.

An impedance variable circuit 737 is made up with two (2) variable capacitors 741 and 742 and an inductor 743. The variable capacitor 741 on one side is connected with the high-frequency power source 731, in parallel with, and the other capacitor 742 is connected with the power supply coil 732, in parallel with. The inductor 743 is connected between both the variable capacitors 741 and 742. An impedance of the variable circuit 737 is changed through changing the capacities of the variable capacitors 741 and 742. This impedance variable circuit 737 is adjusted in impedance thereof, so that an input impedance of the resonance system 740 at the resonating frequency fits to impedance on the side of the high-frequency power source 731. The variable capacitors 741 and 742 are in such already-known structures, that capacities thereof are changed through driving of a rotation shaft by a motor, i.e., the motor is driven by a driving signal from a controller 744, in that structure.

High-frequency voltage is outputted at the frequency of the resonance system 740, from the high-frequency power source 731 through the variable circuit 737 to the power supply coil 732, and thereby a magnetic filed is generated in the power supply coil 732. This magnetic field is strengthened or increased through magnetic resonance by an aid of the resonance coils 733 and 734. Electric power is taken out from the increased magnetic field in vicinity of the resonance coil 734, by means of the load coil 735 while applying the electromagnetic induction therein, to be supplied to the load 736.

In this instance, if the distance between the resonance coils 733 and 734 is changed, an input impedance of the resonance system 740 is also changed. For this reason, if there is no impedance variable circuit 737, impedance matching cannot be obtained, depending on the distance between the resonance coils 733 and 734, and reflection of the electric power to the high-frequency power source 731 generates, and this lowers the transmission efficiency. Or, from other viewpoint, since the frequency fluctuates depending on the distance between the coils, at which the magnetic resonance is generated, the transmission loss comes to be large if the frequency of the magnetic resonance shifts with respect to the output frequency of the high-frequency power source 731. For this reason, it is enough to adjust the frequency of the high-frequency power source fitting to the frequency, at which the transmission loss comes to the smallest, corresponding to the distance between the coils; however, this is not common, since there is a possibility that ill influences be given upon other communication equipments if changing the transmission frequency. For this reason, the controller 744 adjusts the variable capacities 741 and 742, so that the impedance matching can be obtained, when the input impedance of the resonance system 740 fluctuates due to changing of the distance between the coils.

PRIOR ART DOCUMENTS

Patent Documents

[Patent Document 1] Japanese Patent Laying-Open No. 2006-353042 (2006), FIG. 1; and
[Patent Document 2] Japanese Patent Laying-Open No. 2010-141976 (2010), FIG. 1.

Patent Documents

[Non-Patent Document 1] NIKKEI BUSINESS, 2009.1.26, p. 78, Nikkei BP company; and
[Non-Patent Document 2] NIKKEI ELECTRONICS, 2007.12.3 pp. 117-128.

BRIEF SUMMARY OF THE INVENTION

By the way, within the charging system of the conventional technology, which was shown in FIG. 24 mentioned above, since the non-contact communication and the non-contact power transmission are applied, separately or individually, there is necessity of the coil-like antennas, each having the diameter of 4 cm, approximately, respectively. For this reason, when trying to mount such charging system, as shown in FIG. 24, on the portable terminal, upon which a demand of small-sizing is high, in particular, it is necessary to build up two (2) sets of the coil-like antennas mentioned above therein, i.e., has a problem that it is difficult to reduce size of the portable terminal devices.

Further, with the charging system of the conventional technology shown in FIG. 24 mentioned above, in power transmission thereof, since an efficiency of the transmitting apparatus is lowered and power consumption increases if a transmission loss is large at a non-contact portion thereof, it is common to apply an electromagnetic induction method, with which a relatively high efficiency at a short distance (equal or less than several millimeters); however, on the contrary, if the transmission distance is large to a certain extent (for example, 1 to 2 cm, approximately), since the transmission efficiency is deteriorated abruptly, it is necessary to shorten the transmission distance between the transmitting apparatus and the receiving apparatus when charging, in particular, if trying to mount the receiving apparatus on the portable terminal device, such as, by applying an antenna for the receiving apparatus on a surface of the portable terminal device, etc., then there is a problem that a position for mounting is restricted.

Further, a communication frequency of the portable terminal device is relatively high, such as, in 800 MHz band or 2 GHz band, and the antenna to be applied in this communication is advanced in miniaturizing thereof, then it can be built within the communication terminal device. However, when building antennas for the non-contact communication and the non-contact power transmission mentioned above within the portable terminal device, since the radio wave from the communication antenna built within the portable terminal device is several hundreds times higher in the frequency than that for conducting the non-contact communication and the non-contact power transmission, the antenna for conducting the non-contact communication and the non-contact power transmission seems to be a metal plate for the radio wave. For this reason, reflection occurs on the antenna portion for conducting non-contact communication and the non-contact power transmission, and then it has a problem of giving ill influences on a receiving sensitivity of the portable terminal device.

Also, in the non-contact power transmitting system of the conventional technology shown in FIG. 26 mentioned above, although a phenomenon of chaining frequency characteristics between a primary coil and a secondary coil, due to fluctuation of an input impedance of the resonance system because the distance between the magnetic resonance coils fluctuates, is improved with the structure for achieving an impedance matching between a high-frequency power source and the resonance system, by adjusting a variable capacitance of a variable impedance circuit, for example; however, when transmitting an electric power equal to or greater than several Watts, it is difficult to apply a semiconductor, such as, a variable capacitive diode as the variable capacitor, from a viewpoint a capacity for electric power or an electrical strength thereof. For this reason, there is necessity of applying a mechanical variable capacity, such as, a variable capacitor, etc., for example, it is impossible to achieve small-sizing of the transmitter. There is also a problem of insurability because the variable capacitor is a mechanical one.

Further, with the non-contact power transmitting system shown in FIG. 26 mentioned above, it has a problem that the transmission efficiency is lowered contrarily if brining the coil much closer, because of influences of increasing a ratio of transmission through the electromagnetic induction, comparing to the transmission due to the magnetic resonance between the magnetic resonance coils, in the transmission at a very close distance, such as, several millimeters, approximately, at the distance between the magnetic resonance coils.

According to the present invention, for accomplishing the object mentioned above, i.e., the problem mentioned above, the difficulty in small-sizing of the portable terminal device when trying to mount an antenna for receiving the non-contact communication and also the electric power transmitted with non-contact, it is dissolved by sharing an antenna for use of the con-contact communication and an antenna for receiving the electric power transmitted with non-contact, in common with, and also by providing a switchover circuit in a receiving/outputting portion for the antenna shared in common, wherein the switchover circuit is switched to a side of power charging when the antenna shared in common receives the electric power transmitted from the power transmitting apparatus, thereby building up such structure that the received electric power signal is rectified in a rectifier circuit through this switchover circuit, and when it receive a non-contact communication signal, the switchover circuit maintains a side of non-contact communication as it is, and thereby enables the non-contact communication.

Next, about the problem, i.e., when executing the power charging, since there is a necessity of shortening the transmission distance between the power transmitting apparatus and the power receiving apparatus, so as not to deteriorate the efficiency, the position where the antenna is amounted is restricted; as an antenna to be used for transmission of the electric power in the power transmitting apparatus, there is applied a method, being called a magnetic resonance method, i.e., being constructed with a resonance coil having such a coil length that it resonates at the frequency used for the power transmission, not electrically connected with at both ends thereof, and a power supply coil for supplying the electric power to be transmitted through magnetic coupling to the resonance coil, thereby supplying the electric power transmitted from the power transmitting apparatus by the power supply coil, and at the same time transmitting also the non-contact communication signal, while superimposing it on the power transmission signal.

In the similar manner, within the power receiving apparatus is applied the magnetic resonance method, including a resonance coil having such a coil length that it resonates at the frequency used for the power transmission, not electrically connected with at both ends thereof, as an antenna to be used for receiving the electric power, and the electric power received by the resonance coil is taken out from a load coil, which is magnetically coupled with.

With applying such configuration, since the resonating frequency of the resonance coil at the power transmitter side is equal to that of the resonance coil at the power receiver side, the magnetic flux generated by current flowing through the resonance coil at the power transmitter side and the magnetic flux generated by current flowing through the resonance coil at the power receiver side are same in the phases thereof; therefore, those resonance coils are coupled with, strongly, therebetween. This phenomenon is called, the magnetic resonance phenomenon, and since this has characteristics that the decrease of the efficiency is less than that of the electromagnetic induction method, which is mainly applied in the conventional non-contact transmission, even if the coils are separated in the distance therebetween, then the decrease of the transmission efficiency is less when the power transmitting apparatus and the power receiving apparatus are separated in the distance therebetween, in a certain degree, therefore it is possible to achieve the structure having less restriction of the position where a power receiving antenna is mounted, in particular, when mounting the power receiving apparatus on the portable terminal device.

For dissolving the problem of having an ill influence upon receiving sensitivity of the portable terminal device, because reflection occurs on the antenna portion for conducting the non-contact communication and the non-contact receiving of the electric power, in the similar manner to the problem mentioned above, i.e., restricting the position where the antenna can be mounted, there is applied the configuration of removing the resonance coil of the antenna of the power receiver side, as well as, applying the magnetic resonance method to the antennas for use of the power transmitting and the power receiving.

With this configuration, although the magnetic resonance method is applied at the power transmitter side while the electromagnetic induction method at the power receiver side; however, there can be obtained the transmission distance, being nearly equal to that of the case where the magnetic resonance method is applied at the receiver side, in the distance between the coils.

With applying such configuration as mentioned above, since the antenna at the power receiver side is only the load coil, i.e., only a loop-like coil having 1 to several turns of diameter of about 3 cm; since the reflection comes to be small of radio waves use for the communication of the portable terminal device, comparing to the conventional coil would around thickly by several tens turns, therefore it is possible to make the ill influence upon the communication antenna much smaller.

In the above, the frequency applied for power transmission and the frequency for the non-contact communication are same; however explanation will be given on a means for sharing the antenna in common, when the frequencies differs from.

In general, in the transmission with applying the magnetic resonance method therein, the number of turns of the resonance coil is larger than that of the load coil for taking out the electric power received from the power supply coil for supplying the electric power to the resonance coil or the resonance coil, and also the inductance value thereof is large.

In case where the frequency for the non-contact communication and the frequency of the non-contact power transmission are different from, while connecting the first capacitor with the above-mentioned resonance coil at the receiver side, there is provided such configuration that, after connecting the second capacitor in series or in parallel through the first filter circuit, a signal having lower frequency is taken out, and also the load coil is provided in the vicinity of the power receiving coil so as to magnetically couple with the resonance coil, thereby achieving the configuration of taking out a signal having higher frequency to the load coil through the second filter circuit, wherein the capacitance of the first capacitor has such a value that it resonates with the resonance coil upon the signal having the higher frequency, while the capacitance of the second capacitor has such a value that it resonates with the resonance coil upon the signal having the lower frequency, and further the first filter circuit passes therethrough the signal having the lower frequency, while blocking the signal having the higher frequency, and the second filter circuit passes therethrough the signal having the higher frequency, while blocking the signal having the lower frequency, in the configuration there.

With such configuration as mentioned above, it is possible to output the signal having the lower frequency, which resonates upon the resonance coil and the second capacitor, from the resonance coil, and at the same time, to output the signal having the higher frequency, which resonates upon the resonance coil and the first capacitor, from the load coil through the magnetic resonance method, in the similar manner to that of the conventional technology shown in FIG. 26.

Herein, as an example of the size of the coil to be applied in the non-contact power transmission in accordance with the conventional electromagnetic induction method, it has a number of turns of about several turns on the diameter of several cm, if having about 5 W or less than that, to be applied for charging the electric power to the portable equipment, or has several tens turns on the diameter of several tens cm, for a class of several kW, to be applied for charging the electric power to the electric car, etc., wherein the frequency to be applied lies in a range from several tens kHz to several hundreds kHz, and as the transmission distance thereof, it is equal to several cm or less than that, in general. Also, as the size of the coil to be applied in the non-contact transmission of the electric power in accordance with the magnetic resonance method, if having about 5 W or less than that, or has the number of turns from several tens turns to several tens turns on the diameter of several tens cm, for the class of several kW, to be applied for charging the electric power to the electric car, etc., wherein the frequency to be applied lies in a range from several MHz to ten and several MHz, and as the distance between the power supply coil and the resonance coil or between the resonance coil and the load coil, it is equal to 1 cm or less than that, in general.

Next, for dissolving the problem of enlarging the circuit on the transmitter side if adjusting the fluctuation of the input impedance of the resonance system due to the fluctuation of the distance between the coils of the magnetic resonance coil (i.e., the resonance coil), by the variable impedance circuit, there is applied the structure of adding at least a resonance capacitor, resonating with the inductance of the load coil, through series connection or parallel connection thereof, in the similar manner for dissolving the problem of enlarging the above-mentioned coil on the receiver side, comparing to the equipment mounting it thereon.

With applying such configuration mentioned above, since there is obtained a result that the fluctuation of the frequency characteristics comes to be small between the primary coil and the secondary coil due to the fluctuation of the distance between the coils of the magnetic resonance coil (i.e., the impedance fluctuation comes to be small of the input due to fluctuation of the distance between the coils), through the experiment, it is possible to suppress the fluctuation of the frequency characteristics between the primary coil and the secondary coil due to the fluctuation of the distance between the coils, without using a variable impedance circuit, and therefore also the transmitter circuit can be made small in the size thereof.

Further, as a means for making the fluctuation of the frequency characteristics between the primary coil and the secondary coil due to the fluctuation of the distance between the coils of the magnetic resonance coil, plural numbers of resonance coils are provided on a side of the primary coil, and the number of turns thereof is determined so that the respective coil shows the most superior transmission efficiency corresponding to the distance between the load coil, and then, since it is possible to make transmission, mainly, between the resonance coil, which is most superior in the efficiency, corresponding to the distance between the resonance coil on the primary side and the load coil, i.e., it is possible to reduce the fluctuation of the frequency characteristics between the primary coil and the secondary coil due to the fluctuation of the distance between the coils, even by the means mentioned above.

Also, for dissolving the problem that the transmission efficiency is lowered at very close distance between the coils of the magnetic resonance coil, such as, several mm, the power supply coil and the magnetic resonance coil on the primary side are replace with each other in the positions thereof, so that the distance between the power supply coil and the load coil is nearer than that between the resonance coil and the load coil at the primary side. With this, it is possible to suppress deterioration of the transmission efficiency in the case of the magnetic resonance at the distance of around several mm between the primary coil and the secondary coil, and also lowering of the transmission efficiency even in the case of the transmission of very close distance. This is because the electric power can be transmitted from the power supply coil to the load coil, directly, through the electromagnetic induction, since the power supply coil and the load coil come to close each other in the distance thereof, at the very close distance.

Further, in the non-contact power transmission system, as a communication means for conducting the authentication of the equipment for confirming if it is enabled with the non-contact power charging or not, and/or the control of an amount of electric power to be transmitted, etc., a modulation, such as, ASK (Amplitude Shift Keying) modulation, etc., is treated on the signal at the transmitter side, and at the same time in the structure at the receiver side, there is applied a load modulation method for enabling the communication with using the signal received even if not having the electric power in an inside thereof; thereby obtaining the non-contact power transmission system for enabling the communication relatively in ease.

According to the present invention, it is possible to obtain the non-contact power transmission system, the power receiving apparatus and the power transmitting apparatus, for enabling to withhold the terminal device from becoming large in sizes thereof due to mounting of those, i.e., if mounting the non-contact communication means and the non-contact power receiving apparatus for charging up the battery on the terminal device, and having less transmission loss between the antennas, and less influence on the communication sensitivity of the portable terminal device if the transmission distance becomes large, when conducting the non-contact communication and the non-contact power receiving, by applying the magnetic resonance method therein.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Embodiment 1

Explanation will be given on a first embodiment of a non-contact power charging system, according to the present invention, by referring to drawings attached herewith.

Figure 1:
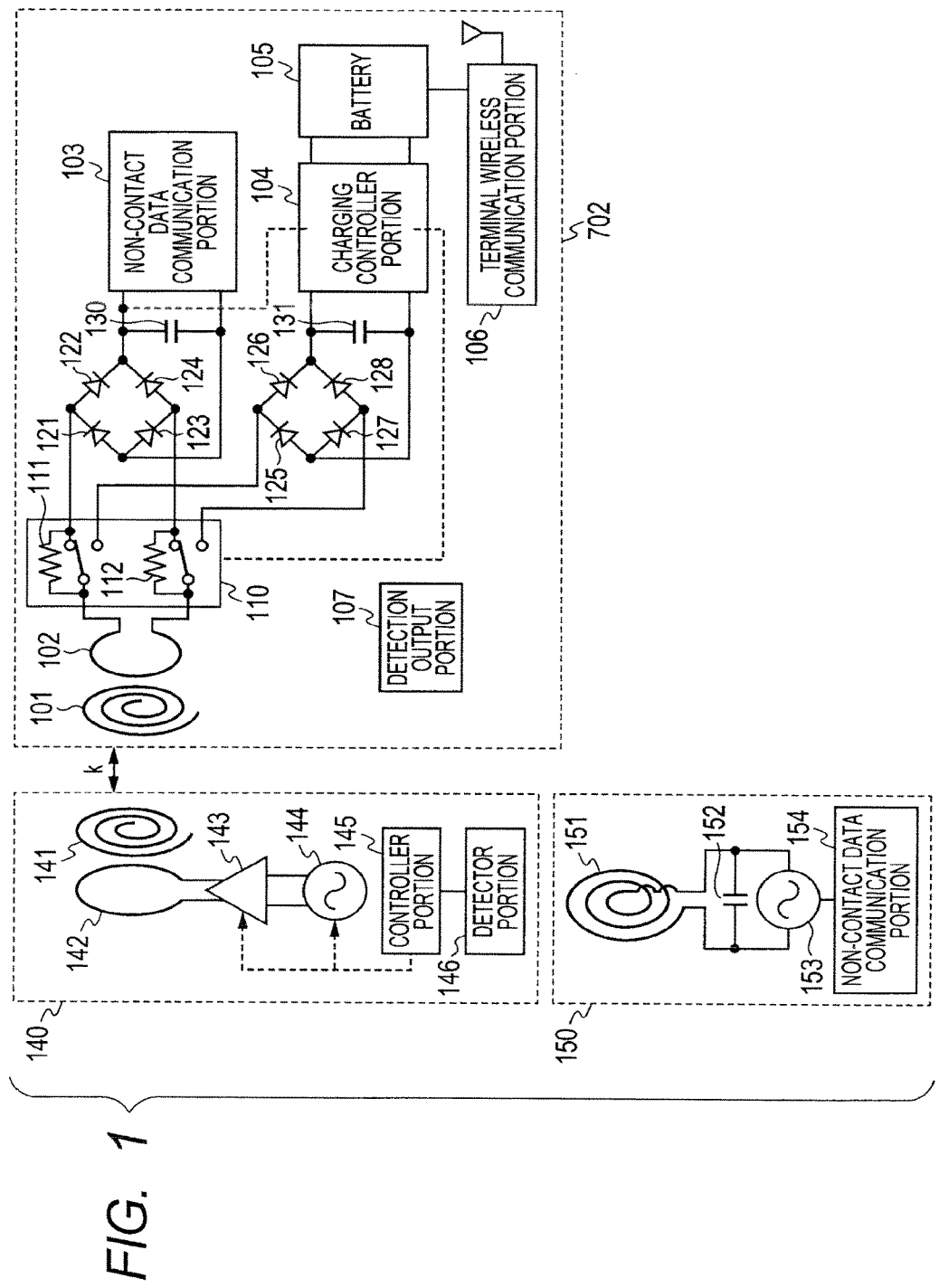
FIG. 1 is a view for showing the configuration of a non-contact power charging system, according to an embodiment 1 of the present invention.

FIG. 1 is a view for showing the first embodiment having the non-contact power charging system to be applied in the present invention.

In the figure, a reference numeral 702 depicts a mobile or portable terminal device, 140 a transmitting apparatus for conducting non-contact transmission of electric power, 150 a non-contact communicating apparatus, wherein the portable terminal device 702 shown in the figure comprises a magnetic resonance coil 101, a load coil 102, an changeover switch 110, rectifying diodes 121, 122, 123, 124, 125, 126, 127 and 128, smoothing capacitors 130 and 131, a non-contact data communication portion 103, a charging controller portion 104, a battery 105, a terminal wireless communication portion 106, and a detection output portion 107, and further damping or attenuating resistors 111 and 112 are added to the changeover switch 110. Also, the power transmitting apparatus 140 shown in the figure comprises a magnetic resonance coil 141, a power supply coil 142, an amplifier portion 143, an oscillator 144, a controller portion 145 and a detector portion 146, and the non-contact communicating apparatus 150 comprises an electromagnetic induction coil, a resonance capacitor 152, an oscillator 153 and a non-contact data transmitting portion 154.

In the figure, on the portable terminal device 702 is provided the load coil 102 at place separating about several millimeters therefrom, with respect to the plane-shaped magnetic resonance coil 101 having about ten and several turns, both ends of which is not connected, while to an output terminal of the load coil 102 is connected the changeover switch 110. Further, one of the output terminals of the changeover switch 110 is inputted into a full-wave rectifier circuit, which is constructed with the rectifying diodes 121-124, and a rectified output thereof is inputted into the non-contact data communication portion 103.

And, the other one of the outputs of the changeover switch 110 is inputted into a full-wave rectifier circuit, which is constructed with the rectifying diodes 125-128, and a rectified output thereof is supplied into the battery 105 through the charging controller portion 104.

Also, on the power transmitting apparatus 140 is provided the power supply coil 142 at the place separating bout several millimeters therefrom, with respect to the plate-shaped magnetic resonance antenna 141 having about ten and several turns, both ends of which are not connected, and to an input terminal of the power supply coil 142 is connected the oscillator 144 through the amplifier 143.

Further, in the non-contact communication apparatus 150 shown in the figure, at a coil end of the electromagnetic induction coil 151 having ten and several turns or more is connected the oscillator 153, together with the resonance capacitor 152.

In the charging system mentioned above, first of all, explanation will be given on the operation when communication is made from the non-contact communication apparatus 150 to the portable terminal device 702, in non-contact manner.

The oscillator 153 provided within the non-contact communication apparatus 150 oscillates at a carrier wave frequency, at which the non-contact communication is conducted (for example, 13.56 MHz for RFID, etc.), and at the same time, in the non-contact data communication portion 154, modulation is made on the oscillated frequency corresponding to data to be transmitted, and thereby a communication signal modulated is irradiated in the form of electromagnetic energy, at high efficiency, by means of the antenna, being so adjusted that the resonating frequency of the electromagnetic coil 151 and the resonance capacitor 152 comes to be equal to the carrier wave frequency.

On the other hand, in the portable terminal device 702, since the magnetic resonance coil 101 is adjusted to resonate with the frequency equal to that of the non-contact communication signal, current flows through the coil 101 at the most due to irradiation from the non-contact communication apparatus 150, thereby exiting high voltage across both ends of the load coil 102, and this exited voltage is inputted into the rectifier circuit, which is constructed with the rectifying diodes 121-124, as it is, through the changeover switch 110. The non-contact communication signal inputted, after being smoothed by the smoothing capacitor 130 to be DC voltage, is supplied to the non-contact data communication portion 103 as a power source, and at the same time the modulated data is also demodulated in the non-contact data communication portion 103. On the other hand, communication from the non-contact data communication portion 103 to the non-contact communication apparatus 150 is conducted, in the reverse direction, through making detection on fluctuation of an amount of reflection from the magnetic resonance coil 101 to the electromagnetic coil 151, by changing an input impedance of the non-contact data communication portion 103 corresponding to the transmission data, for the signal received by the magnetic resonance coil 101.

Next, explanation will be given on the operation when power transmission is conducted from the power transmitting apparatus 140 to the portable terminal device 702, in the contact-less manner.

The oscillator 144 provided in the power transmitting apparatus 140 oscillates at 13.56 MHz, same to the RFID, etc., which is applied in the non-contact communication apparatus 150, as the frequency signal for transmitting the electric power in contact-less manner (inductively), and the frequency signal is amplified in the electric power thereof in the amplifier 143 and oscillates the magnetic resonance coil 141 by means of the power supply coil 142. Since the magnetic resonance coil 141 is so adjusted that it resonated with the frequency equal to the power transmission frequency, current flows at the most at the transmission frequency and generates a strong magnetic field.

On the other hand, in the portable terminal device 702, since the magnetic resonance coil 101 resonates at the frequency equal to the transmission frequency, current flows at the most at the transmission frequency, and high voltage is excited across both ends of the load coil 102. When this excited voltage reaches to a value, being equal to or larger than a certain predetermined one, since the charging controller portion 104 changes the changeover switch 110 to a power receiving side, the signal received is rectified by the rectifier circuit, which is constructed with the rectifying diodes 125-128, to be the DC voltage through the smoothing capacitor 131, and is supplied to the charging controller portion 104. Within the charging controller portion 104, the DC voltage supplied thereto is charged into the battery 105, and control is done on an amount of charging so that the battery 105 is not damaged due to overcharging, etc.

However, the detection output portion 107 of the portable terminal device 702 outputs a specific identifier, and if the portable terminal device 702 approaches the power transmitting apparatus 140 so that the identifier from the detection output portion 107 can be detected by the detector portion 146, the controller portion 145 brings the oscillator 144 into the ON condition, thereby starting the power transmission.

Further, when conducting the power transmission from the power transmitting apparatus 140, although the changeover switch 110 is already changed to the receiving side; however in this instance, it is so constructed that the signal received is inputted to the con-contact communication side, after being attenuated, through the attenuating resistors 111 and 112 on the non-contact communication side. With applying such structure, when piling up a non-contact communication signal on the power transmission signal, it is possible to receive the electric power, and at the same time, the non-contact communication, too. Herein, a reason of lowering the level of the power receiving signal through the attenuating resistors lies in that the power receiving signal is considerably high comparing to that of the non-contact communication signal.

With adoption of such structure mentioned above, in transmission between the power transmitting apparatus 140 and the portable terminal device 702, because of the connection due to the magnetic resonance method, it is possible to obtain a charging system being less in the loss therein, even if the transmission distance is long, comparing to the conventional electromagnetic induction method, and further, if sharing the antennas in common, to be applied for the non-contact communication and the non-contact power transmission, it is possible to suppress an increase of a mounting volume of the portable terminal device 702, accompanying with when mounting those thereon, as small as possible.

Embodiment 2

Figure 2:
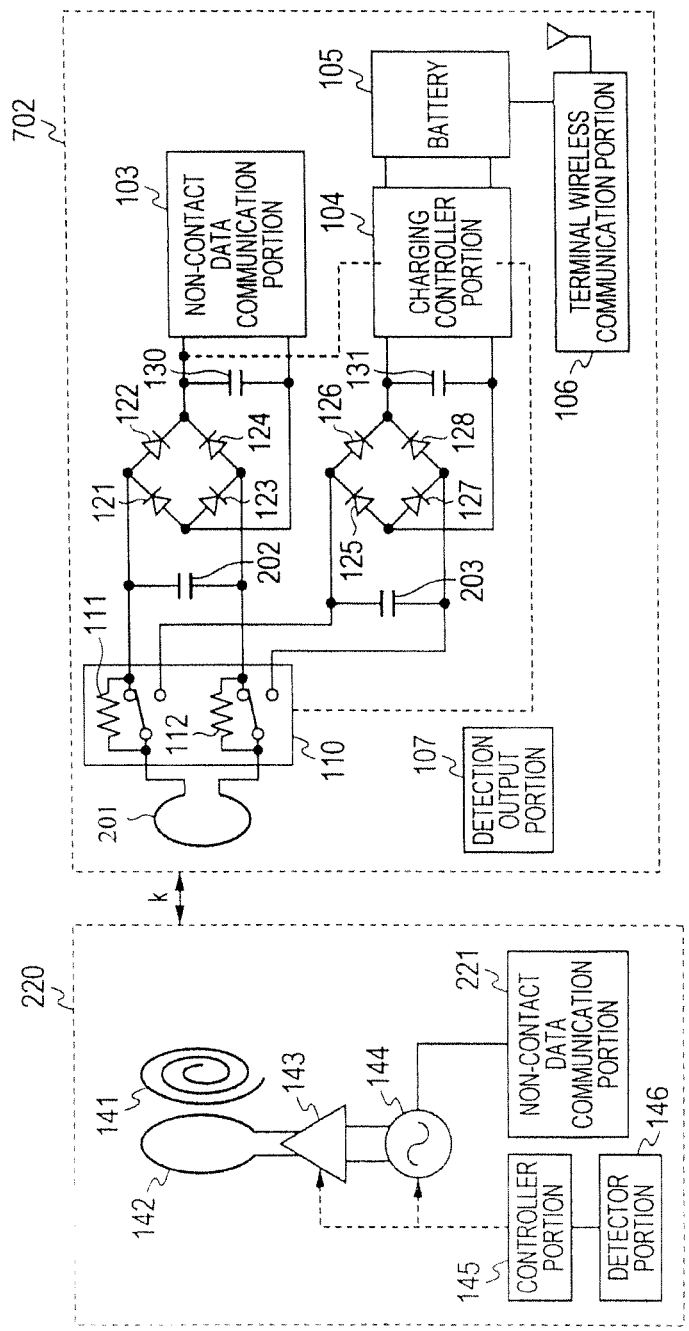
FIG. 2 is a view for showing the configuration of a non-contact power charging system, according to an embodiment 2.

FIG. 2 is a view for showing a second embodiment of the non-contact power charging system, to be applied in the present invention.

The figure shows that applying a coil of the electromagnetic induction method in the portable terminal device 702 while a coil of the magnetic resonance method in a power transmitting apparatus 220, comparing to the first embodiment shown in FIG. 1. However, in the figure, although there is applied the power transmitting apparatus 220 unifying the communication apparatus and the power transmitting apparatus in one body, but the present invention should not be limited to this. As was shown in FIG. 1, the coil of the electromagnetic induction method may be applied to the portable terminal device while applying the coil of the magnetic resonance method to the power transmitting apparatus, even in case where the communication apparatus and the power transmitting apparatus are separated from each other.

In the figure, a reference numeral 201 depicts a loop antenna coil having about 2-3 turns, 202 and 203 resonance capacitances, each resonating with the loop antenna coil 201 at the transmission signal frequency, and 220 a non-contact power transmitting apparatus combining the con-contact communication means therein, wherein the power transmitting apparatus 220 having the non-contact communication means comprises a non-contact data communication portion 221, but others corresponding to those shown in FIG. 1 are attached with the same reference numerals, and the explanations thereof will be omitted herein.

In the power transmitting apparatus 220, when conducting the non-contact communication between the portable terminal device 702, the non-contact data communication portion 221 modulates the oscillation signal of the oscillator 144 in accordance with the communication data, and the signal modulated is amplified by the amplifying portion 143, to be transmitted through a power transmission antenna, which is constructed with the power supply coil 142 and the magnetic resonance coil 141.

The signal transmitted from the power transmitting apparatus is received by the loop antenna coil 201 of the portable terminal device 702, and resonates with a capacitance value of the resonance capacitor 202 through the changeover switch 110; thereby the highest voltage signal is applied to the rectifier circuit, which is constructed with the rectifying diodes 121-124, at the transmission frequency. And, the non-contact communication signal outputted from the rectifier circuit is smoothened by the smoothing capacitor 130 to be DC voltage, and it is supplied to the non-contact communication portion 103 as the power source thereof, and at the same time, the data modulated is also demodulated within the con-contact data communication portion 103.

Next, explanation will be given on the operation when power transmission is conducted from the power transmitting apparatus 220 to the portable terminal device 702.

Through power amplification of the signal of the oscillator 144 provided in the power transmitting apparatus 220 within the amplifying portion 143, and through excitation of the magnetic resonance coil 141 by the power supply coil 142, the power transmission signal is outputted from the magnetic resonance coil 141.

The signal transmitted is received upon the loop antenna coil 201 of the portable terminal device 702, but when the voltage of the signal received reaches to a value, being equal to or larger than a certain predetermined one, since the charging controller portion 104 changes the changeover switch 110 to the power receiving side, it resonates with the capacitance value of the resonance capacitor 203 through the changeover switch 110, so that it reaches to the highest voltage at the power transmission frequency in the rectifier circuit, which is constructed with the rectifying diodes 125-128, and at the same time, the signal received is rectified into the DC voltage through the smoothing capacitor 131, and supplied to the charging controller portion 104. In the charging controller portion 104, the DC voltage supplied thereto is charged into the battery 105, and at the same time, control is done on an amount of charging so that the battery 105 is not damaged due to overcharging, etc.

Further, when conducting the power transmission from the power transmitting apparatus 220, although the changeover switch 110 is already changed to the receiving side; however in this instance, since it is so constructed that the signal received is inputted to the con-contact communication side, after being attenuated, through the attenuating resistors 111 and 112 on the non-contact communication side, therefore it is possible to receive the electric power, and at the same time, the non-contact communication, as well, by piling up the non-contact communication signal on the power transmission signal.

With applying such structure as was mentioned above, in addition to obtaining the effect similar to that of the first embodiment mentioned above, since it is possible to apply the loop antenna coil having about 2-3 turns, as a receiving antenna, the portable terminal device 702 can be small-sized much more.

Further, with applying the loop antenna coil having about 2-3 turns, as the receiving antenna, since reflection of the radio wave to be applied in the communication of the terminal wireless communication portion 106 comes to be small, and therefore it is possible to reduce influences upon the terminal wireless communication portion 106 to be small much more.

Embodiment 3

Figure 3:
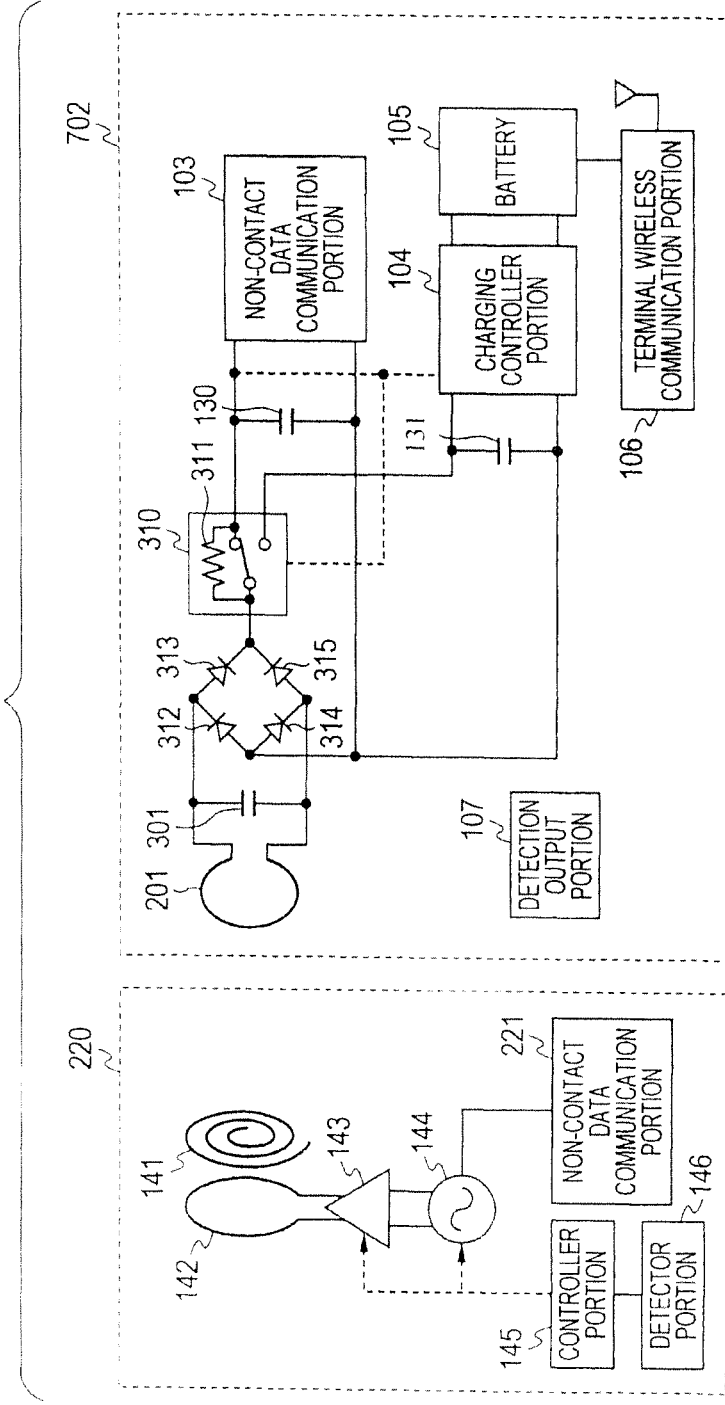
FIG. 3 is a view for showing the configuration of a non-contact power charging system, according to an embodiment 3.

FIG. 3 is a view for showing a third embodiment of the non-contact power charging system, to be applied in the present invention.

In the figure, a reference numeral 301 depicts a resonance capacitor, 310 a changeover switch, 311 an attenuation resistor, 312, 313, 314 and 315 rectifying diodes, which are used in common with in the non-contact communication and the non-contact power transmission, but others corresponding to those shown in FIG. 2 are attached with the same reference numerals, and the explanations thereof will be omitted herein.

In the power transmitting apparatus 220, when conducting the non-contact communication between the portable terminal device 702, the non-contact data communication portion 221 modulates the oscillation signal of the oscillator 144 in accordance with the communication data, and the signal modulated is amplified by the amplifying portion 143, to be transmitted through a power transmission antenna, which is constructed with the power supply coil 142 and the magnetic resonance coil 141.

This signal transmitted, resonating at the transmission frequency by the loop antenna coil 201 of the portable terminal device 702 and the resonance capacitor 301, is received with the largest signal amplitude, and is rectified by the rectifying diodes 312, 313, 314 and 315, which are used in common with. In this instance, since the charging controller portion 104 determines the power transmission is for charging, when the voltage rectified therein is equal to or greater than a certain value, and changes the changeover switch 310 to the charging side, the voltage rectified is smoothened by the smoothing capacitor 131, and DC voltage for charging the battery 105 is supplied by the charging controller portion 104.

With such the embodiment as was mentioned above, in addition to obtaining the effect similar to that of the second embodiment mentioned above, through sharing the rectifying diodes in common with, in the non-contact communication and the power receiving, it is possible to reduce the size of the portable terminal device 702 much more.

Next, explanation will be given on the effects according to the embodiment(s) of the present invention, by referring to FIGS. 4, 5 and 6.

Figure 4:
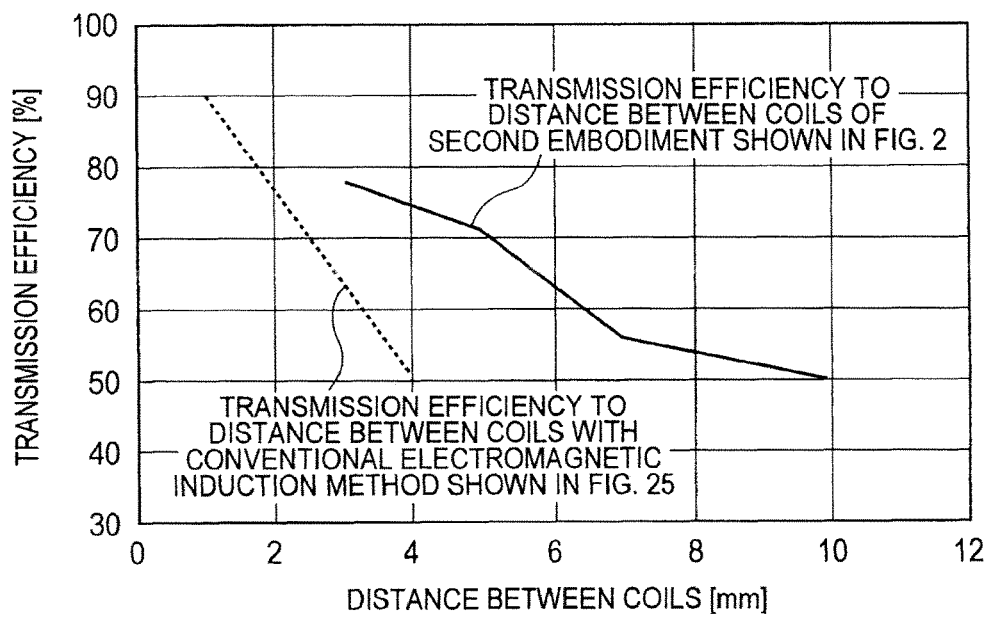
FIG. 4 is a result of experiments for showing a difference in a transmission efficiency depending on a distance between coils, between a magnetic resonance method in transmission and a electromagnetic induction method in receiving and the conventional electromagnetic induction method.
Figure 25:
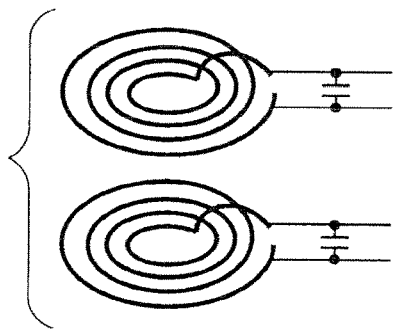
FIG. 25 is a block diagram for showing the structure of the coils of the electromagnetic induction method, which is achieved by the conventional technology.
Figure 26:
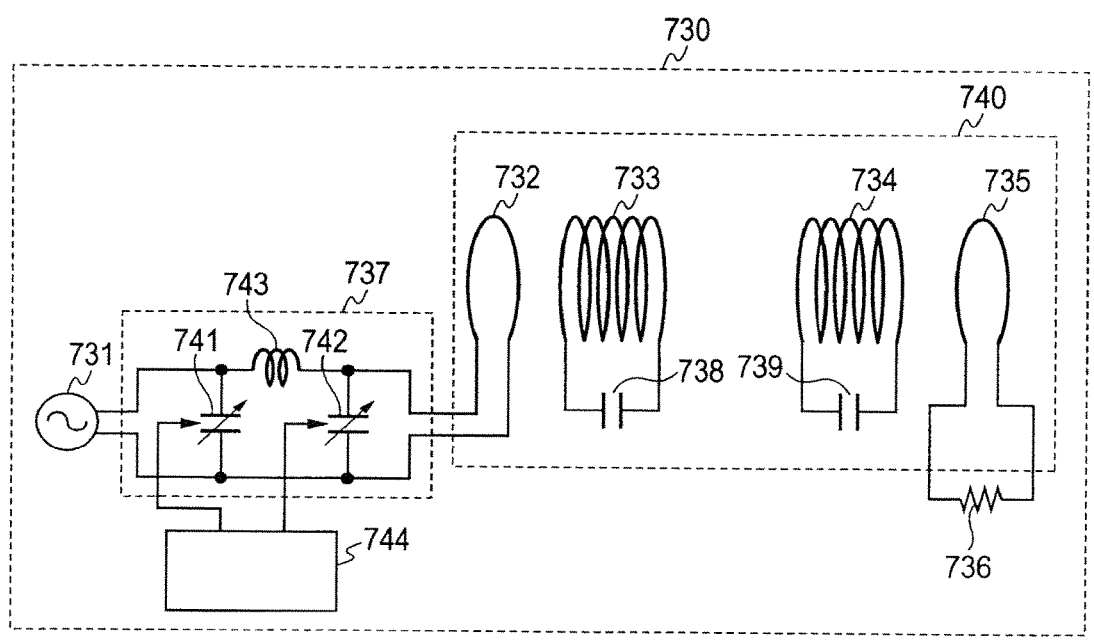
FIG. 26 is a view for showing the structure of the conventional example when conducting non-contact power transmission with the magnetic resonance method.

FIG. 4 shows an experimental result of the transmission efficiency characteristics with respect to the distance between the coils, when applying the magnetic resonance method into the transmitting side while applying the conventional electromagnetic induction method, being constructed with the loop-like antenna coil and the resonance capacitor, into the receiving side, as was shown by the second embodiment of the non-contact power charging system shown in FIG. 2, and the transmission efficiency when applying the conventional electromagnetic induction method as is shown in FIG. 25, wherein the horizontal axis is the distance between the coils and the vertical axis the transmission efficiency.

In FIG. 2, the diameter of the magnetic resonance coil on the transmitting side shown is 4 cm and a number of turns thereof is about 30 turns, and it has a resonating frequency of about 20 MHz, and on the receiving is provided a serial resonating type loop antenna coil made of a loop coil of the diameter of 3 cm, having about 3 turns, and a resonance capacitor of 100 pF, while the diameter of an electromagnetic induction type transmission coil shown in FIG. 25 is 4 cm and a number of turns thereof is about 20 turns, and it has the transmission frequency of about 120 kHz, and the resonance capacity is several μF.

From the figure, the electromagnetic induction method of the conventional technology shown in FIG. 25 is superior in the transmission efficiency when the distance between the coils is short, but if the coils are separated about 4 mm in the distance between them, the efficiency goes down to around 50%. On the contrary to this, with the second embodiment, the efficiency of about 75% can be obtained if the distance between the coils is 4 mm, and therefore it can be seen that a lowering of the transmission efficiency is less even when the coils are separated in the distance therebetween, if applying the magnetic resonance method onto the receiving side while applying the electromagnetic induction method onto the receiving side.

Figure 5:
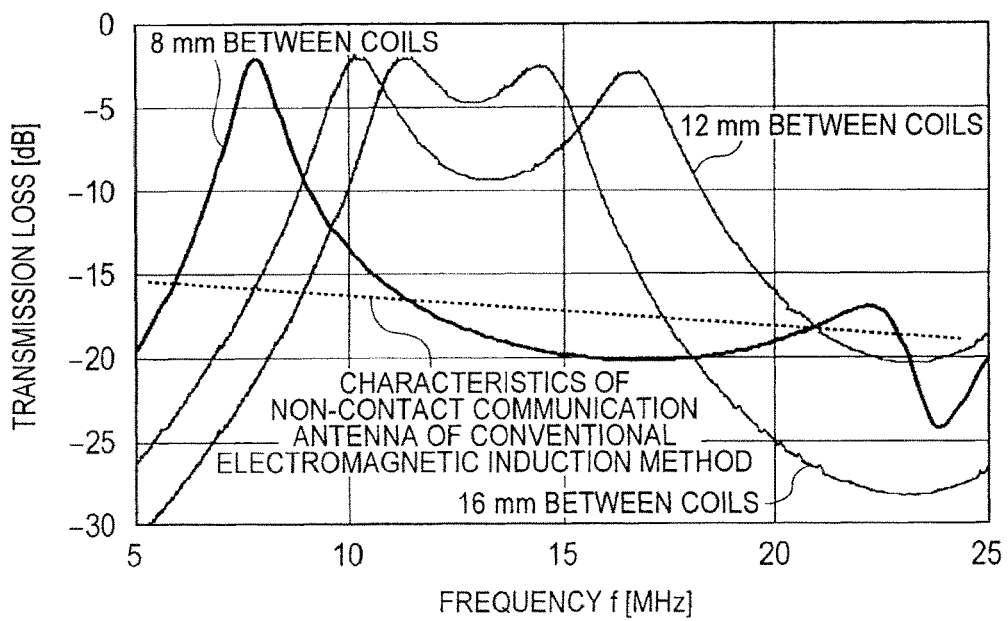
FIG. 5 is a result of experiments for showing a difference in dependence upon the distance between the coils, between the magnetic resonance method and the conventional electromagnetic induction method.

Also, FIG. 5 shows experimental results of the frequency characteristics of the transmission efficiency with respect to the distance between the coils, when applying the magnetic resonance method to both the transmitting side and the receiving side, as the non-contact power transmitting method of the first embodiment shown in FIG. 1, and the frequency characteristics of the transmission efficiency with the conventional electromagnetic induction method, in which both the transmuting side and the receiving side are constructed with the loop-like coils of about 2-3 turns and the resonance capacitors, respectively, wherein the horizontal axis is the frequency and the vertical axis the transmission efficiency.

Also, as to the coils used in the experiments, in the magnetic resonance method shown in FIG. 1, the diameter of the magnetic resonance coil is 4 cm and the number of turns is about 30 turns, and it has the resonating frequency of about 20 MHz, while both the power supply coil and the load coil have the diameter of 3 cm and the number of turns of 1 turn. On the other hand, the loop antenna coil of the conventional electromagnetic induction method has the diameter of 4 cm and the number of turns of about 3 turns, wherein the transmission frequency is about 20 MHz, as same as that of the magnetic resonance method, and the resonance capacity is a hundred and several tens pF.

From the figure, it can be seen that the power transmitting method applying the magnetic resonance method the of first embodiment shown in FIG. 1 therein has a frequency dependence depending on the distance between the coils, but the transmission loss is less than that of the conventional electromagnetic induction method.

Figure 6:
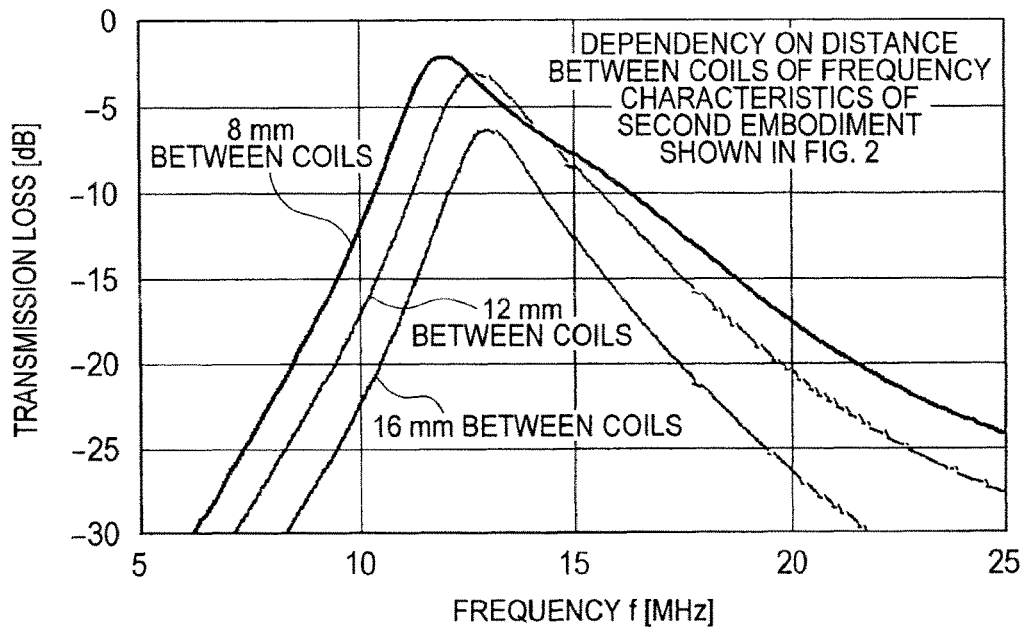
FIG. 6 is a result of experiments for showing a difference in dependence upon the distance between the coils, applying the magnetic resonance method in transmission and the electromagnetic induction method in receiving.

Next, FIG. 6 shows an experimental result of the frequency characteristics with respect to the distance between the coils, when applying the magnetic resonance method onto the transmitting side, with the second embodiment of the non-contact power charging system shown in FIG. 2, as the non-contact communication means, while applying the electromagnetic induction method, which is constructed with the conventional loop-like antenna of 2-3 turns and the resonance capacitor, onto the receiving side. The coil used in the experiment has the diameter of 4 cm, the number of turns of about 3 turns, and the resonance capacity of a hundred and several tens pF.

Comparing FIG. 5 and FIG. 6, since the fluctuation of the frequency characteristics with respect to the distance between the coils is less when applying the magnetic resonance method onto the transmitting side and applying the conventional magnetic-field coupling type loop antenna onto the receiving side, as is in the second embodiment shown in FIG. 2, than applying the magnetic resonance method onto both the transmitting and receiving sides as shown in FIG. 5, it is possible to obtain a stable electric power received irrespective of the distance between the coils, even in the case where the transmission frequency is fixed to 13.56 MHz, etc., for example.

Figure 7A:
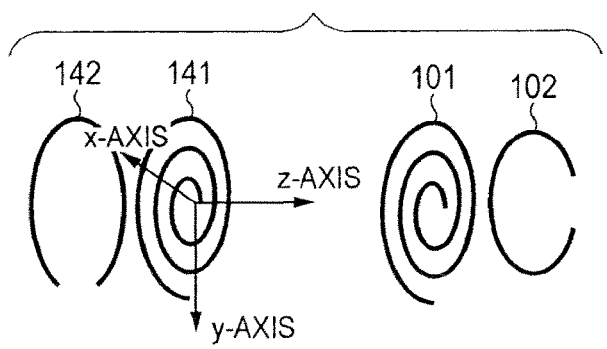
FIG. 7A is a block diagram for showing the structure of the coils of the magnetic resonance method, according to the embodiment 1.
Figure 7B:
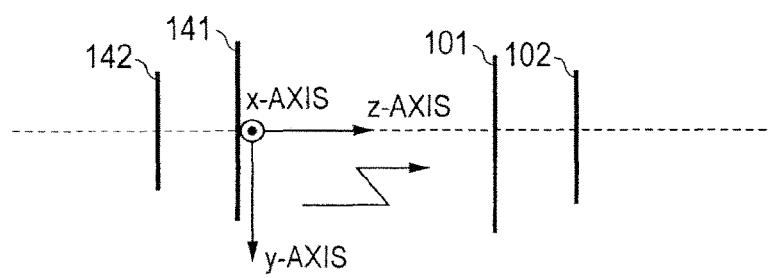
FIG. 7B is a block diagram of the structure of the coils of the magnetic resonance method, according to the embodiment 1, when seeing them just beside to a transmitting direction.

Also, FIG. 7A is a block diagram for showing the structure of the coil of the magnetic resonance method according to the first embodiment of the non-contact power charging system of the present invention, and FIG. 7B is a block diagram when seeing FIG. 7A just beside to a transmitting direction, wherein the same reference numerals are attached on the corresponding portions shown in FIG. 1, and thereby the explanations thereof will be omitted herein. The coil surfaces of the power supply coil 142, the magnetic resonance coils 141 and 101, and the load coil 102 are disposed to be in parallel with one another, and they are so constructed that the transmission efficiency between the coils becomes high if optimizing the distance between the coils on a z-axis in the structure shown in FIG. 7B, aligning central points of the coils on a straight line, then as the other embodiments, explanation will be given on the following embodiments upon basis of the disposition shown in FIG. 7B.

Embodiment 4

Figure 8:
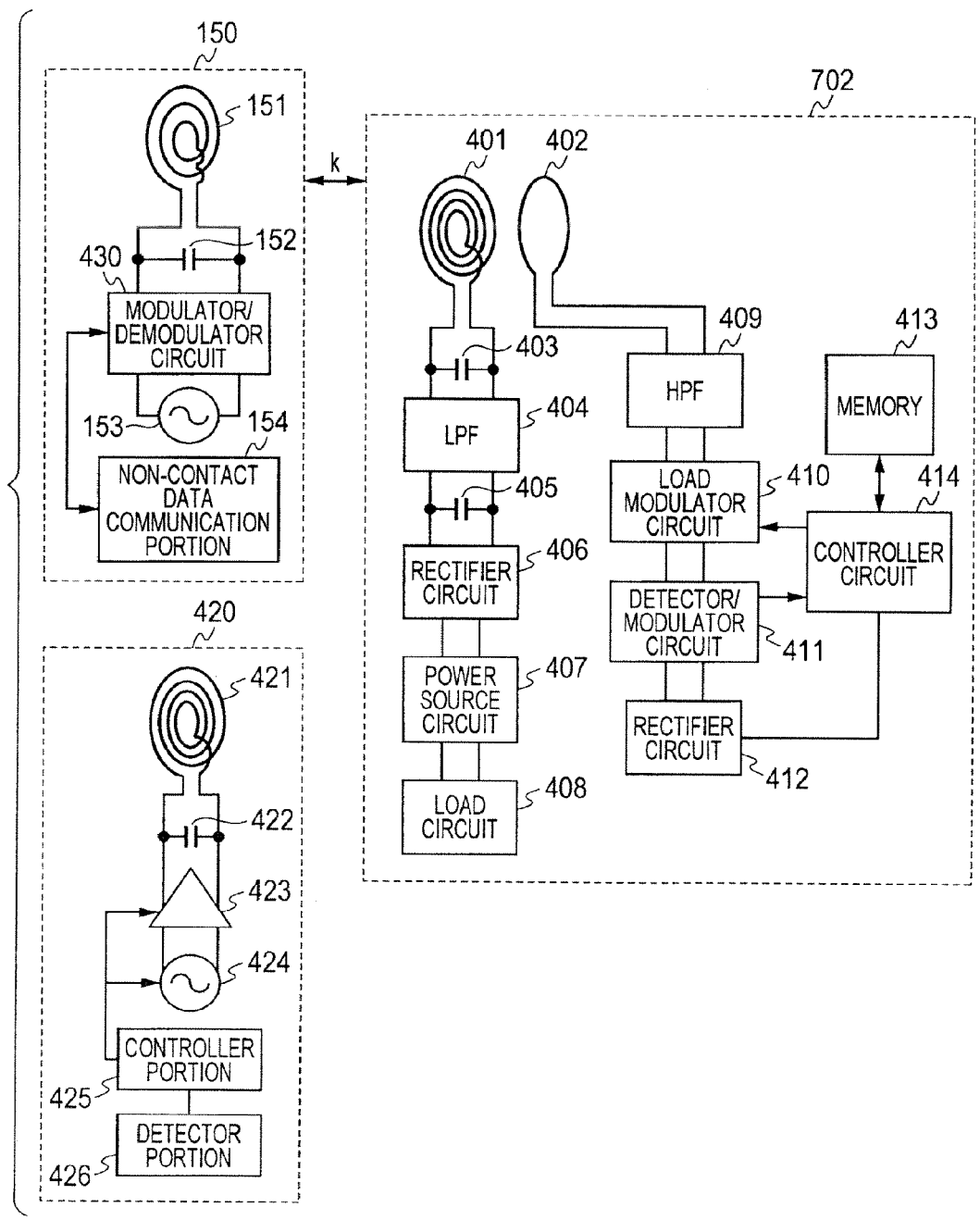
FIG. 8 is a view for showing the configuration of a non-contact power charging system, according to an embodiment 4 of the present invention.

FIG. 8 is a view for showing a fourth embodiment of the non-contact power charging (or, power transmitting) system, to be applied in the present invention.

In the figure, a reference numeral 702 depicts a portable terminal device, 150 a non-contact communication apparatus, 420 a power transmitting apparatus of the electromagnetic indication method, wherein the portable terminal device 702 in the figure comprises an electromagnetic induction coil 401 serving both as the magnetic resonance coil, in common, a load coil 402, a resonance capacitor 403, a low-pass filter 404, a resonance capacitor 405, a rectifier circuit 406, a power source circuit 407, a load circuit 408, a high-pass filter 409, a load modulator circuit 410, a detector/demodulator circuit 411, a rectifier circuit 412, a memory 413, and a controller circuit 414. Also, the power transmitting apparatus 420 through the electromagnetic induction comprises an electromagnetic induction coil 421, a resonance capacitor 422, a power amplifier 423, an oscillator 424, a control portion 425, and a detect portion 426, but other than those corresponding to those shown in FIG. 1 are attached with the same reference numerals, and therefore the explanations thereof will be omitted herein.

In the figure, in the portable terminal device 702, the resonance capacitor 403 is connected in parallel with the electromagnetic induction coil 401 serving both as the magnetic resonance coil, in common, and at the same time, and the resonance capacitor 405 is connected with, through the low-pass filter 404, and the rectifier circuit 406, the power source circuit 407 and the load circuit 408 are connected with.

Also, the load coil 402 is disposed in the vicinity of the electromagnetic induction coil 401 serving both as the magnetic resonance coil, in common, at the distance of about several millimeters therefrom, and is magnetically coupled with that electromagnetic induction coil 401 serving both as the magnetic resonance coil, in common. Further, the load coil 402 is connected, through the high-pass filter 409, with the load modulator circuit 410, the detector/demodulator circuit 411 and the rectifier circuit 412.

Also, in the power transmitting apparatus 420 through the electromagnetic induction, the resonance capacitor 422 is connected in parallel with the electromagnetic induction coil 421, i.e., being in such structure that it resonates with the frequency of the transmission signal from the oscillator circuit 424, which is amplified by the power amplifier 423.

In such non-contact power transmitting system as was mentioned above, first of all, explanation will be given on the operation when communication is made from the non-contact communication apparatus 150 to the portable terminal device in the contact-less manner.

The oscillator 153 provided in the non-contact communication apparatus 150 oscillates at a carrier-wave frequency (for example, 13.56 MHz for RFID, etc.), upon which the non-contact communication is conducted, and at the same time, within the non-contact data communication portion 154 and a modulator/demodulator circuit 430, the oscillating frequency is modulated corresponding to the data to be transmitted, and the communication signal modulated is irradiated in the form of electromagnetic energy at high efficiency, by means of an antenna, with which the resonating frequency of the electromagnetic induction coil 151 and the resonance capacitor 152 is adjusted to be equal to the carrier frequency.

On the other hand, in the portable terminal device 702, since the resonating frequency of the electromagnetic induction coil 401 serving both as the magnetic resonance coil, in common, and the resonance capacitor 403 is adjusted to be 13.56 MHz, i.e., the carrier frequency, large current flows through the electromagnetic induction coil 401 serving both as the magnetic resonance coil, in common, and thereby generating strong magnetic field. Due to this strong magnetic field, an input is made into the detector/demodulator circuit 411 by the load coil 402, which is magnetically coupled with, through the high-pass filter 409 and the load modulator circuit 410, and therein is demodulated a con-contact signal received, and is inputted into the controller circuit 414. The controller circuit 414 reads out the data corresponding to the received signal from the memory 413, and conducts the load modulation with an aid of the load modulator circuit 410. On the contrary to this, the non-contact communication apparatus 150 is so constructed that fluctuation of the receiving impedance of the portable terminal device 702 corresponding to the load modulation from the load modulator circuit 410 is detected and demodulated by the modulator/demodulator circuit 430, to be transmitted to the non-contact communication portion 154. In this instance, since the circuits after the low-pass filter 404 prevent the frequency of the received signal from passing therethrough, therefore it is possible to neglect the circuits after the low-pass filter 404, and at the same time, since the high-pass filter 409 shows a passing characteristic to the frequency of the received signal, it is possible to neglect the loss herein. Also, power supply to the controller circuit 414 and the memory 413 can be achieved with using the electric power, which is obtained by rectifying the signal received from the non-contact communication apparatus 150 through the rectifier circuit 412, i.e., no battery is necessary, or may be supplied from a battery built within the portable terminal device 702.

Next, explanation will be given on the operation when the power transmission is made from the power transmitting apparatus 420 through the electromagnetic induction method to the portable terminal device 702, in the contact less manner.

In the power transmitting apparatus 420, through the electromagnetic induction method, the case that the portable terminal device 702 is disposed in the neighborhood is detected by the detect portion 426, and the control portion 425 brings the oscillator 424 and the power amplifier 423 into the ON condition. With this, in the oscillator 424, a signal is oscillated at the frequency of 100 kHz band, for example, lower than 13.56 MHz of RFID, etc., which is used in the non-contact communication apparatus 150, as the frequency for transmitting electric power in the contact-less manner, and it is power-amplified in the power amplifier 423 and supplied to the resonance circuit, which is constructed with the electromagnetic induction coil 421 and the resonance capacitor 422 as the transmission power. Since the electromagnetic induction coil 421 and the resonance capacitor 422 resonate in 100 kHz band, being equal to the frequency of the transmission power supplied, large current flows through the electromagnetic induction coil 421, thereby generating a strong magnetic field. In this instance, by placing the portable terminal device 702 in the vicinity of the electromagnetic induction coil 421, since a resonating frequency of the circuit, which is built up with the electromagnetic induction coil 401 serving both as the magnetic resonance coil and the resonance capacitor 405, same to the frequency of the transmission power, then the electromagnetic induction coil 421 and the electromagnetic induction coil 401 serving both as the magnetic resonance coil couple with, strongly, through electromagnetic induction, and therefore it is possible to take out the electric power of 100 kHz band, which is received from the resonance capacitor 405. For this reason, after being rectified into DC voltage by the rectifier circuit 406, which is connected with the resonance capacitor 405, and being converted into certain voltage by the power source circuit 407, the received electric power is supplied to the load circuit 408. In this instance, since the low-pass filter 404 shows the characteristics of passing through, with respect to the frequency of the electric power, therefore a loss herein can be neglected. Also, since the high-pass filter 409 can prevent it from passing through, with respect the electric power received, then influences of the circuit including the load coil 402 and the high-pass filter 409 and thereafter can be neglected.

Also, by replacing the power source circuit 407 with a charge control circuit, as well as, the load circuit 408 with a battery, it is possible to achieve a non-contact power charging system.

With applying such the structure as was mentioned above, i.e., by conducting the non-contact power transmission through the electromagnetic induction upon the electric power received of 100 kHz band, and applying the electromagnetic conduction coil, which is used for receiving the electric power, as the magnetic resonance coil, it is possible to obtain a non-contact power charging (power transmission) system, enabling the communication and the receiving of the electric power even when the frequency of the non-contact communication differs from the frequency of non-contact power transmission, in addition to obtaining the effect (s) similar to that in the non-contact power charging (power transmission) system shown in FIG. 1.

Embodiment 5

Figure 9:
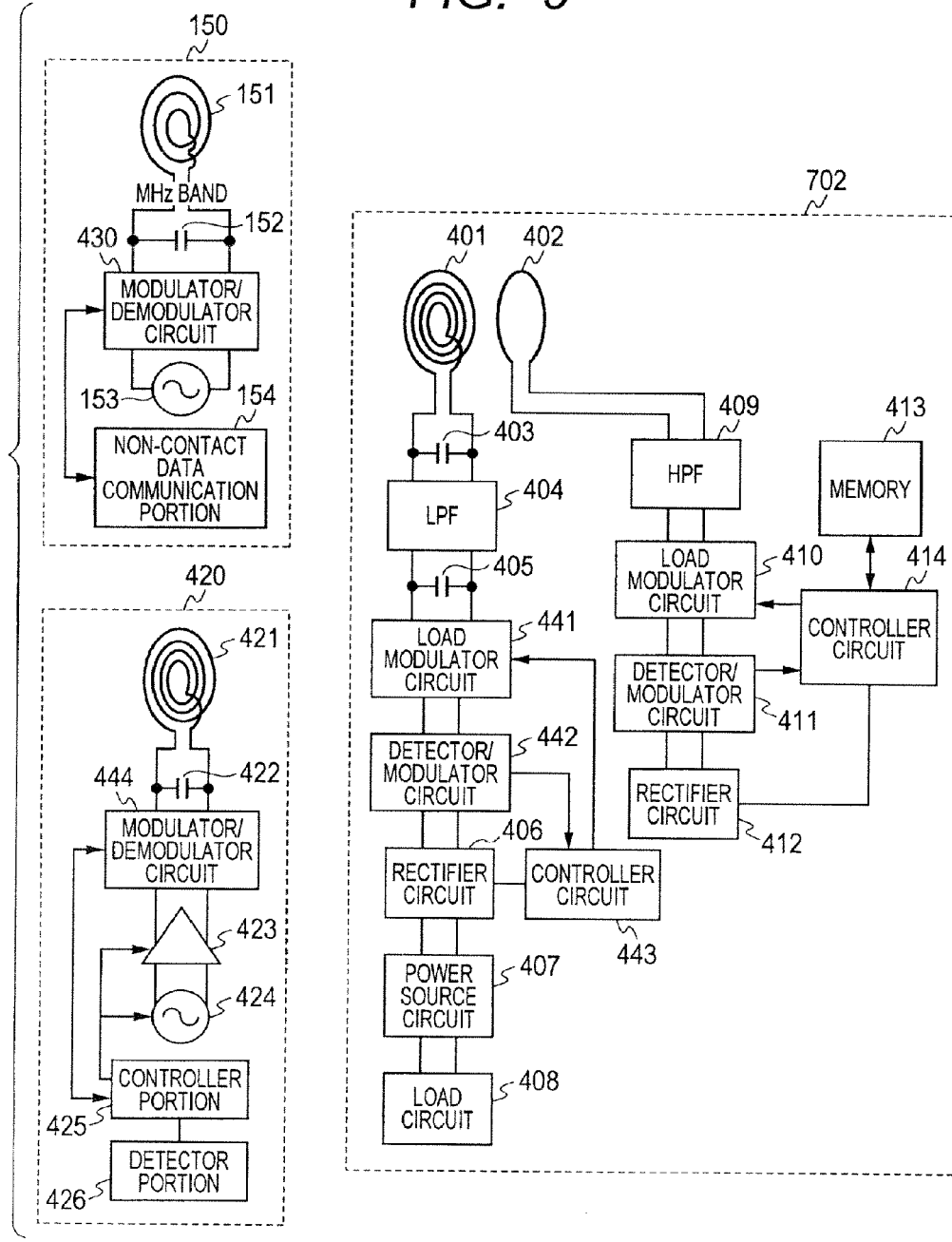
FIG. 9 is a view for showing the configuration of a non-contact power charging system, according to an embodiment 5.

FIG. 9 is a view for showing a fifth embodiment of the non-contact power charging (power transmission) system, to be applied in the present invention.

In the figure, a reference numeral 441 depicts a load modulator circuit, 442 a detector/demodulator circuit, 443 a controller circuit, and 444 a modulator/demodulator portion, respectively; however, the other parts than the above, corresponding to those shown in FIG. 8, are attached with the same reference numerals, and therefore explanations thereof will be omitted herein.

In FIG. 9, the portable terminal device 702 has the structure of adding the load modulator circuit 441 and the detector/demodulator circuit 442 between the resonance capacitor 405 and the rectifier circuit 406, while the power transmitting apparatus 420 with the electromagnetic induction method has the structure of adding the modulator/demodulator portion 444 between the amplifier 423 and the resonance capacitor 422.

In the figure, since the non-contact communication between the non-contact communication apparatus 150 and the portable terminal device 702 is similar to that of the fourth embodiment shown in FIG. 8, the explanation thereof will be omitted herein, and explanation will be given on the operation when the non-contact transmission is conducted from the power transmitting apparatus 420 to the portable terminal device 702 with the electromagnetic induction method.

In the power transmitting apparatus 420 with the electromagnetic induction method, a power transmission signal, being obtained by amplifying the electric power of the oscillation signal from the oscillator 424 in the power amplifier 423, is modulated in the modulator/demodulator portion 444, and is transmitted from the resonance coil 421. This electric power transmitted is received by the electromagnetic induction coil 401 serving both as the magnetic resonance coil, in the portable terminal device 702. The power transmission signal received is rectified in the rectifier circuit 406, thereby to receive the electric power, and the signal received is modulated in the detector/demodulator circuit 442, thereby to input the data signal received into the controller circuit 443. The controller circuit 443 conducts load modulation on the data signal corresponding to the data signal received is modulated, with an aid of the load modulator circuit 441. This load modulation signal is demodulated in the modulator/demodulator portion 444 of the power transmitting apparatus 420 with the electromagnetic induction method.

With applying such the structure as was mentioned above, since it is possible to conduct the communication, at the same time of the electric power transmission, by conducting the modulation also upon the power transmission signal, in the non-contact power transmission, too, in addition to obtaining the effect (s) similar to that in the non-contact power charging (power transmission) system shown in FIG. 8; therefore it is possible, for example, to conduct the communication necessary for controlling when executing an authentication, if the portable terminal device 702 is enabled or not with the non-contact power transmission, etc., and/or controlling the power transmission, with superimposing the signal on the electric power transmission.

Embodiment 6

Figure 10:
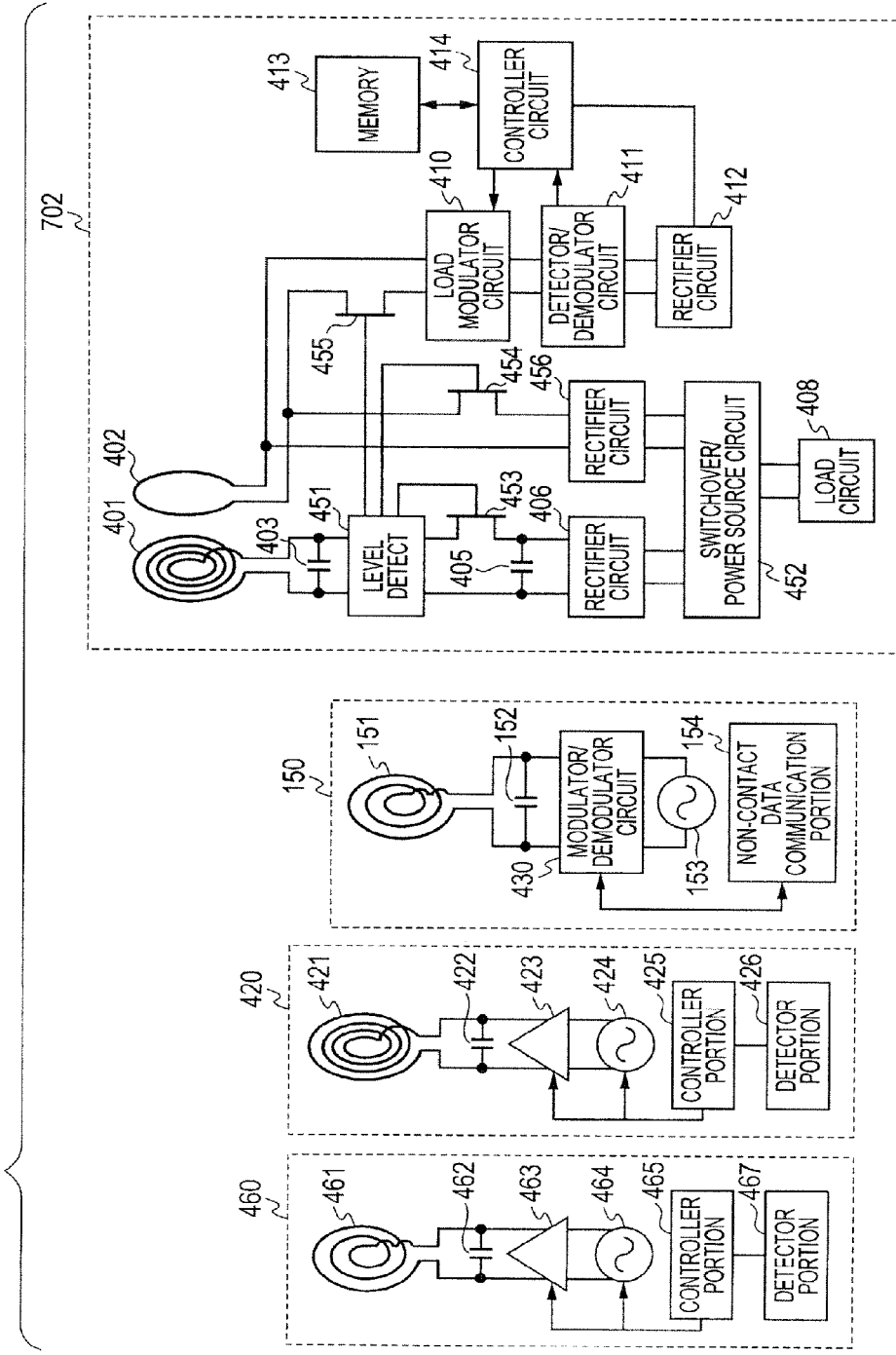
FIG. 10 is a view for showing the configuration of a non-contact power charging system, according to an embodiment 6.

FIG. 10 is a view for showing a sixth embodiment of the non-contact power charging (power transmission) system, to be applied in the present invention.

In the figure, a reference numeral 451 depicts a level detector circuit, 452 a switchover & power source circuit, 453, 454 and 455 field effect transistors (FET), 456 a rectifier circuit, and 460 a power transmitting apparatus with the electromagnetic induction method, respectively. Further, the power transmitting apparatus 460 with the electromagnetic induction method is constructed with an electromagnetic induction coil 461, a resonance capacitor 462, a power amplifier 463, an oscillator 464, a controller portion 465 and a detector portion 467; however, the other parts than the above, corresponding to those shown in FIG. 8, are attached with the same reference numerals, and therefore explanations thereof will be omitted herein.

In the figure, in the portable terminal device 702, the level detector circuit 451 and the field effect transistor (FET) 453 are provided between the resonance capacitor 403 and the resonance capacitor 405, and the rectifier circuit 406 is connected with the load circuit 408 through the switchover & power source circuit 452. Further, with the load circuit 402 is connected the switchover & power source circuit 452 through the field effect transistor (FET) 454 and the rectifier circuit 406. Further, within the power transmitting apparatus 460 with the electromagnetic induction method, the resonance capacitor 462 is connected with the electromagnetic induction coil 461, in parallel, i.e., being constructed to resonate with the frequency of the power transmission signal from the oscillator circuit 464, which is amplified in the power amplifier 463; thus, although being similar in the structure to the power transmitting apparatus 420 with the electromagnetic induction method, but the resonance frequency due to the electromagnetic induction coil 461 and the resonance capacitor 462 and the oscillating frequency of the oscillator 464 are equal to the resonating frequency of the non-contact communication apparatus 150; i.e., 13.56 MHz.

Within such the non-contact power transmitting system as was mentioned above, first of all, explanation will be given the case when communication is conducted from the non-contact communication apparatus 150 to the portable terminal device 702, in the contact-less manner.

The level detector circuit 451 of the portable terminal device 702 conducts the communication, by turning the field effect transistor (FET) 455 into ON condition, under the condition when it receives no-signal thereon, while turning the field effect transistors (FET) 453 and 454 in OFF condition, at the same time, and by receiving the signal with the load modulator circuit 410, the detector/demodulator circuit 414 and the rectifier circuit 412, through the magnetic resonance coupling, which is constructed with the electromagnetic induction coil 401 serving both as the magnetic resonance coil, the resonance capacitor 403 and the load coil 402, when receiving the non-contact communication signal of 13.56 MHz from the non-contact communication apparatus 150.

Next, when receiving the electric power of 100 kHz band transmitted from the power transmitting apparatus 420 with the electromagnetic induction method, with non-contact, the level detector circuit 451 turns the field effect transistor (FET) 453 into ON condition, while turning the field effect transistors (FET) 454 and 455 into OFF condition, at the same time. With doing this, the electric power transmitted from the power transmitting apparatus 420 with the electromagnetic induction method is received by the resonance circuit, which is constructed with the electromagnetic induction coil 401 serving both as the magnetic resonance coil and the resonance capacitor 405, in accordance with the electromagnetic induction method, and the electric power is supplied to the load circuit 408 through the rectifier circuit 406 and the switchover & power source circuit 452.

Next, when receiving the electric power of 13.56 MHz transmitted from the power transmitting apparatus 460 with the electromagnetic induction method, with non-contact, the level detector circuit 451 turns the field effect transistor (FET) 454 into ON condition, while turning the field effect transistors (FET) 453 and 455 into OFF condition, at the same time. With doing this, the electric power transmitted from the power transmitting apparatus 460 with the electromagnetic induction method is received through the magnetic resonance coupling, which is constructed with the electromagnetic induction coil 401 serving both as the magnetic resonance coil, the resonance capacitor 403 and also the load coil 402, and the electric power is supplied to the load circuit 408 through the rectifier circuit 406 and the switchover & power source circuit 452.

With applying such the structure as was mentioned above, it is possible to receive the electric power transmitted with non-contact even if there is difference between the frequency bands thereof, in addition to obtaining the effect(s) similar to that in the non-contact power charging (power transmission) system shown in FIG. 8; i.e., receiving the electric power through the electromagnetic induction, which is transmitted on the 100 kHz band, while receiving the electric power transmitted at the 13.56 MHz in accordance with the magnetic resonance method, which is transmitted at 13.56 MHz, for the electric power transmission with non-contact.

Embodiment 7

Figure 11:
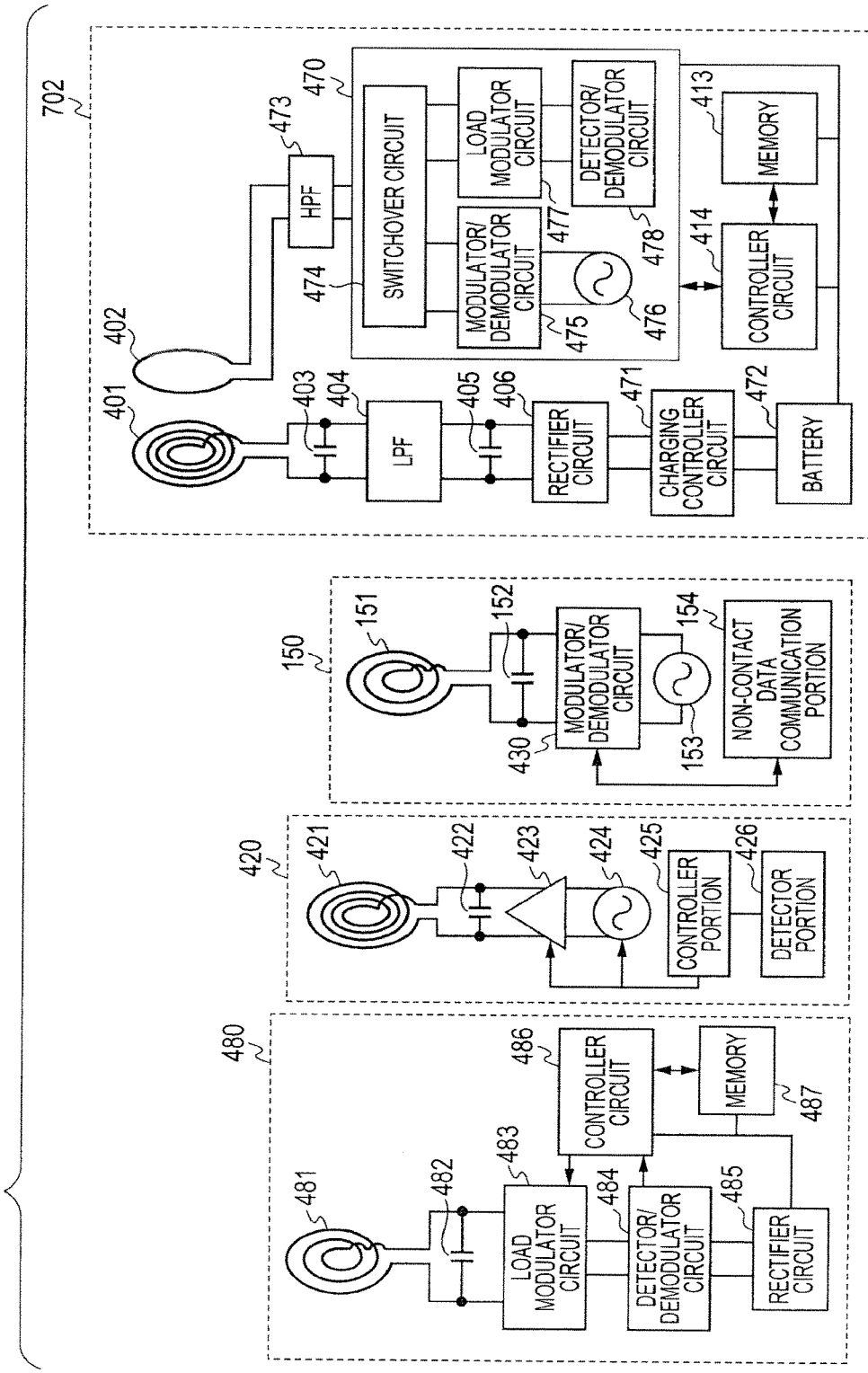
FIG. 11 is a view for showing the configuration of a non-contact power charging system, according to an embodiment 7.

FIG. 11 is a view for showing a seventh embodiment of the non-contact power charging (power transmission) system, to be applied in the present invention.

In the figure, a reference numeral 470 depicts a non-contact communication portion, 471 a charging controller circuit, 472 a battery, 473 a high-pass filter, and 480 a non-contact communicating apparatus, respectively, wherein the non-contact communication portion 470 is constructed with a switchover circuit 474, a modulator/demodulator circuit 475, an oscillator 476, a load modulator circuit 477 and a detector/modulator circuit 478, while the non-contact communicating apparatus is constructed with an electromagnetic induction coil 481, a resonance capacitor 482, a load modulator circuit 483, a detector/modulator circuit 484, a rectifier circuit 485, a controller circuit 486 and a memory 487; however, the other parts than the above, corresponding to those shown in FIG. 8, are attached with the same reference numerals, and therefore explanations thereof will be omitted herein.

In the figure, within the portable terminal device 702, with the output of the rectifier circuit 406 are connected the charging controller circuit 471 and the battery 472, and with the load coil 402 are connected the modulator/demodulator circuit 475 and the oscillator 476 through the high-pass filter 473 and the switchover circuit 474. Further, with the switchover circuit 474 are connected the load modulator circuit 477 and the detector/modulator circuit 478.

Also, in the non-contact communicating apparatus 480, the resonance capacitor 482 is connected with the electromagnetic induction coil 481, in parallel, and further, with that are connected the load modulator circuit 483, the detector/modulator circuit 484 and the rectifier circuit 485.

In the figure, explanation will be given on the operation when receiving the electric power transmitted from the power transmitting apparatus 420 with the electromagnetic induction method. The electric power signal on the 100 kHz band transmitted from the power transmitting apparatus 420 is received by the resonance circuit made up with the electromagnetic induction coil 401 serving both as the magnetic resonance coil and the resonance capacitor 405 of the portable terminal device 702, and it charges the battery 472 through the rectifier circuit 406 and the charging controller circuit 471.

Next, explanation will be given on the operation when the communication is conducted with non-contact, from the non-contact communication apparatus 150 to the portable terminal device 702. The non-contact communication signal transmitted from the non-contact communication apparatus 150 is received in accordance with the magnetic resonance method, which is built up with the electromagnetic induction coil 401 serving both as the magnetic resonance coil, the resonance capacitor 403 and the load coil 402, and is inputted into the switchover circuit 474 through the high-pass filter 473. Since the switchover circuit 474 is switched to the side of the load modulator circuit 477 under the condition that no signal is inputted therein, the non-contact communication signal received is demodulated within the detector/modulator circuit 478 and the load modulator circuit 477, and therefore it is possible to made the non-contact communication.

Next, explanation will be made when the communication is made between the non-contact communicating apparatus 480. Since the non-contact communicating apparatus 480 contains no oscillator therein, the communication is passive, like in a FRID card having no power source therein, then if the communication should be conducted on the portable terminal device 702 with the non-contact communicating apparatus 480, the switchover circuit 474 is switched to side of the modulator/demodulator circuit 475, as well as, bringing the oscillator 476 and the modulator/demodulator circuit 475 into ON condition. With doing this, the signal oscillating from the oscillator 475 is modulated within the modulator/demodulator circuit 475, to be transmitted to the non-contact communicating apparatus 480. In the non-contact communicating apparatus 480, the non-contact communication signal received from the portable terminal device 702 is demodulated within the detector/modulator circuit 484. Also, the non-contact communication signal from the non-contact communicating apparatus 480 is modulated within the load modulator circuit 483. On the portable terminal device 702, the communication can be made with the non-contact communicating apparatus 480, by demodulating a fluctuation in impedance within the modulator/demodulator circuit 475.

With applying such the structure as was mentioned above, in addition to obtaining the effect(s) similar to that in the non-contact power charging (power transmission) system shown in FIG. 8, the non-contact communication apparatus 150 corresponds to a questioner (a reader/writer in the RFID) and the detector/modulator circuit 484 to a responder (the RFID card in the RFID). Also, by adding the modulator/demodulator circuit 475 and the oscillator 476 (corresponding to the questioner) in addition to the load modulator circuit 477 and the detector/modulator circuit 478 (corresponding to the responder), it is possible to make the communication with the RFID card, etc., having no oscillator therein.

Embodiment 8

Figure 12:
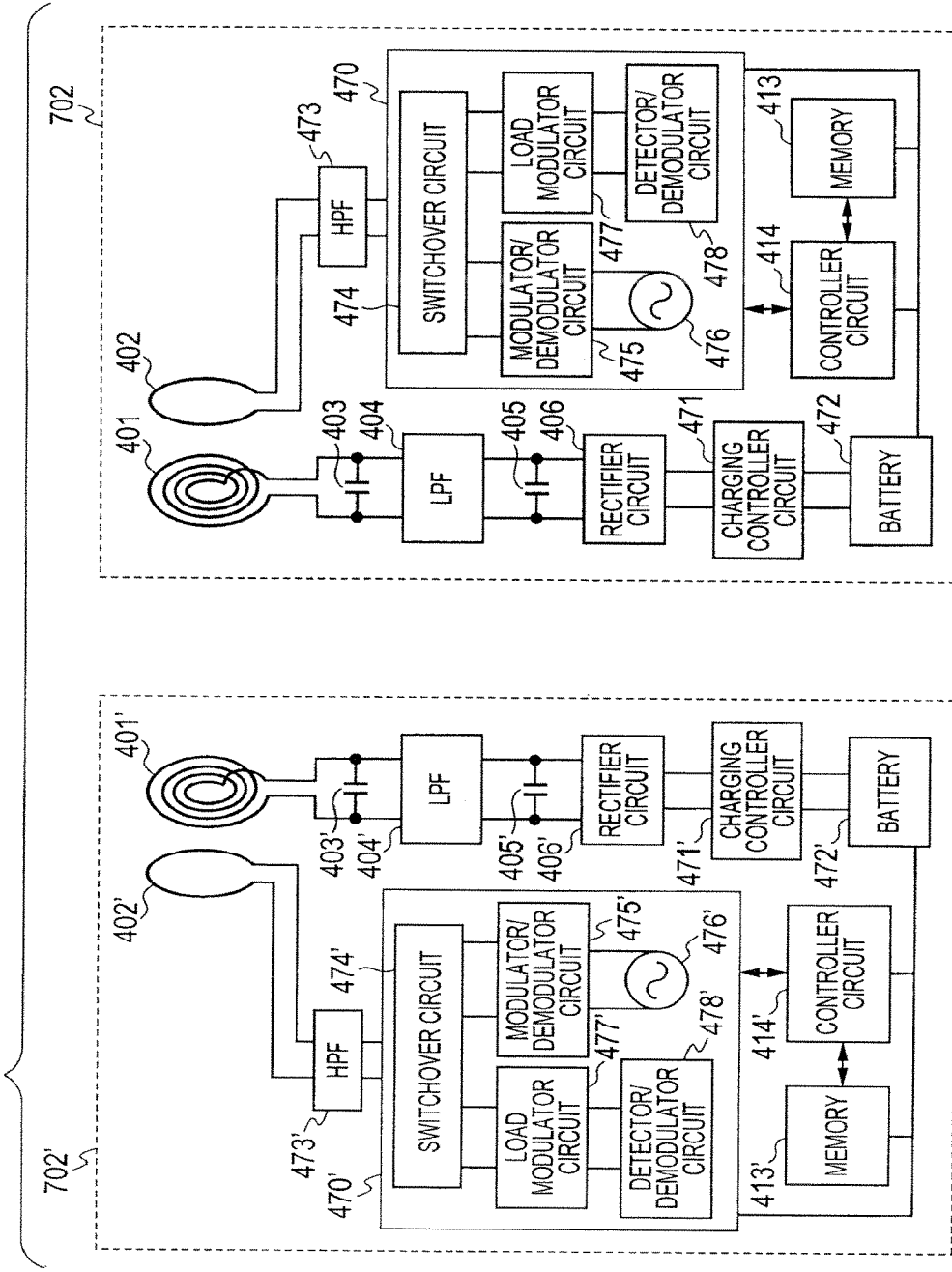
FIG. 12 is a view for showing the configuration of a non-contact power charging system, according to an embodiment 8.

FIG. 12 is a view for showing an eighth embodiment of the non-contact power charging (power transmission) system, to be applied in the present invention.

In the figure are shown two (2) sets of the portable terminal devices 702, each of which is shown as the seventh embodiment in FIG. 11, being disposed close to each other, wherein one (1) of them is shown with attaching a dash (') to each reference numeral thereof for distinguishing them from each other.

In the figure, explanation will be given on the operation when the portable terminal device 702 reads out contents within the memory 413' provided in the portable terminal device 702'. In the portable terminal device 702, the oscillator 476 and the modulator/demodulator circuit 475 are turned into ON condition, and also the switchover circuit 474 is switched to the side of the modulator/demodulator circuit 475. With doing this, the signal oscillated from the oscillator 476 is modulated within the modulator/demodulator circuit 475 to be transmitted to the portable terminal device 702'. In the portable terminal device 702', normally, since the switchover circuit 474' is changed to the side of the modulator/demodulator circuit 475', the non-contact communication signal received from the portable terminal device 702 is demodulated within the detector/modulator circuit 478', and the controller circuit 414' reads out the data corresponding to the received data from the memory 413', and conducts the load modulation thereon by means of the load modulator circuit 477'. In the portable terminal device 702, the fluctuation in impedance is detected from the modulator/demodulator circuit 475, to be demodulated, and thereby the data signal received from the portable terminal device 702' is received.

With applying such structure as was mentioned above, in addition to obtaining the effect(s) similar to those in the non-contact power charging (power transmission) shown in FIG. 11, it is possible to make communication between the portable terminal devices, by adding the circuits corresponding to the questioner (i.e., the modulator/demodulator circuit 475 and the oscillator 476) to the portable terminal device 702.

Figure 13:
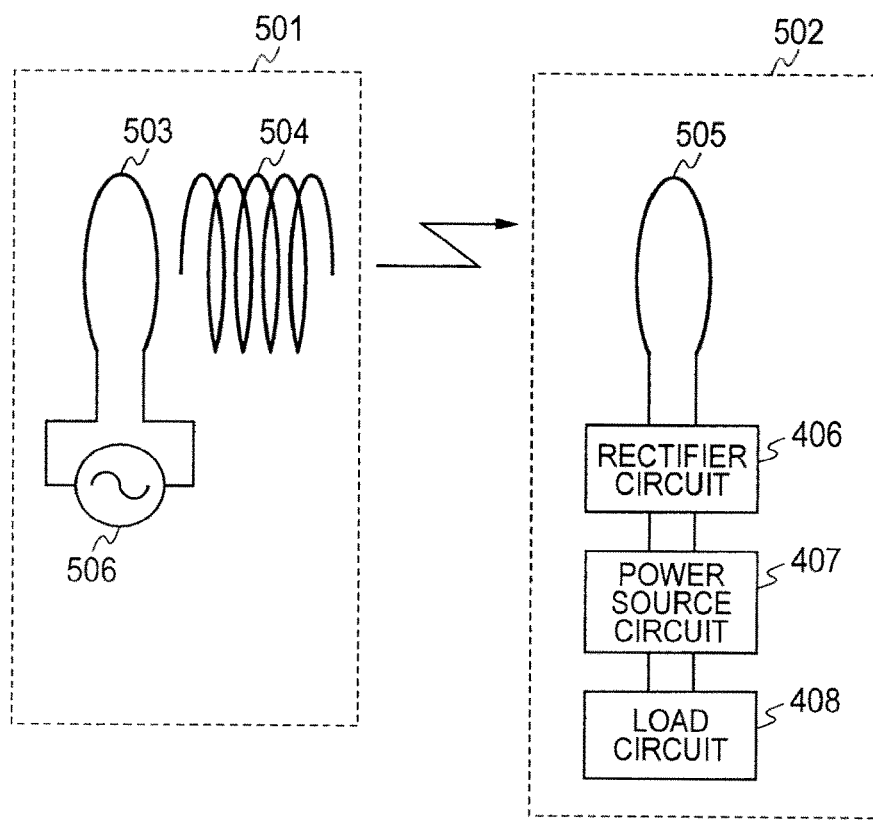
FIG. 13 is a view for showing the configuration of a non-contact power charging system, according to an embodiment 9 of the present invention.

FIG. 13 is a view for showing a ninth embodiment of the non-contact power charging (power transmission) system, to be applied in the present invention.

In the figure, a reference 501 depicts a power transmitter, 502 a power receiver, 503 a power supply coil, 504 a primary resonance coil, 505 a load circuit and 506 a high-frequency wave source, respectively; however, the other parts than the above, corresponding to those of the fourth embodiment shown in FIG. 8, are attached with the same reference numerals, and therefore explanations thereof will be omitted herein.

In the figure, the power transmitter 501 is constructed with the high-frequency wave source 506, the power supply coil 503 and the primary resonance coil 504, wherein the primary resonance coil 504 is disposed close to the power supply coil 503 and also the high-frequency wave source 506 is connected with the power supply coil 503.

The power receiver 502 is built up with the load coil 505, the rectifier circuit 406, the power source circuit 407 and the load circuit 408, wherein the load circuit 408 is connected with the load coil 505 through the rectifier circuit 406 and the power source circuit 407, and the non-contact power transmission system is built up with the power transmitter 501 and the power receiver 502.

In the figure, the power supply is conducted from the high-frequency wave source 506 to the power supply coil 503 at the frequency equal to a self-resonating frequency, which is determined by a stray capacitance (i.e., a parasitic capacitance) between a self-inductor and a wire of the coil of the primary resonance coil 504. Due to excitation of the primary resonance coil 504 by the power supply coil 503, at the frequency equal to the self-resonating frequency through the electromagnetic induction function, large current flows in the primary resonance coil 504 and thereby generating a strong magnetic field.

Herein, the self-resonating frequency "f" of the coil can be obtained by the following equation, if assuming that the inductance value of the primary resonance coil is "L" and the stray capacitance between the lines is "C":

$$F = 1/(2\pi\sqrt{(LC)})$$

However, since the self-resonating frequency fluctuates depending on the coupling condition between the power supply coil 503 and the load coil 505, it is necessary to confirm an actual self-resonating frequency through a simulation and or a test.

With such the structure as was mentioned above, when the power receiver 502 is located in the vicinity of the power transmitter 501, the strong magnetic field magnetically couples with the load coil 505 of the power receiver 502, and then electromotive force (EMF) is generated across both terminals of the load coil 505. The electromotive force (EMF) generated is rectified into DC voltage by the rectifier circuit 406, and is inputted into the power source circuit 407. Since the voltage outputted from the rectifier circuit 406 is fluctuated by the electric power transmitted and the change of transmission efficiency due to shift of the self-resonating frequency of the resonance coil and/or the distance between the coils, depending on the distance between the primary resonance coil 504 and the load coil 505, it is supplied to the load circuit 408 after being converted to voltage of a constant value necessary for the load circuit 408.

With applying such structure as mentioned above, it is possible to receive the electric power transmitted from the power transmitter 501 upon the power receiver 502, with non-contact, through the magnetic coupling, and in addition thereto, since the electric power transmitted can be received only upon the load coil, as the coil to be applied in the power receiver 502, then the power receiver 502 can be made small in the size thereof.

Further, if showing an example of the coil configuration shown in FIG. 13, i.e., commonly applicable size and the number of turns thereof are as follows: the diameter of the power supply coil 503 is several cm, and the number of turns thereof is from 1 turn to several turns, the diameter of the primary resonance coil 504 is several cm, and the number of turns thereof is several tens turns, approximately, in case when charging the electric power to small-sized portable equipment of several W, approximately, and further, as the self-resonating frequency is used 10 MHz band, and as the load coil 505, it has the number of turns from 1 turn to several turns, approximately.

On the other hand, if showing an example of the coil configuration to be applied for the power transmission from several tens W to several hundreds Ws and larger than that, such as, for supplying or charging the electric power to a personal computer of a notebook type, and for charging the electric power to an electric vehicle, etc., i.e., commonly applicable size and the number of turns thereof are as follows:

the diameter of the power supply coil 503 is several tens cm, and the number of turns thereof is from 1 turn to several turns, the diameter of the primary resonance coil 504 is several tens cm, and the number of turns thereof is several tens turns, approximately, and further, as the self-resonating frequency is from several hundreds Hz to 1 MHz, approximately, the load coil 505 has the diameter of several tens cm and the number of turns from 1 turn to several turns, approximately.

With the magnetic resonance method as was mentioned above, since it shows a tendency of lowering the transmission efficiency if a loss is large due to resistance component of the resonance coil, it is common to use a copper wire having the diameter from 1 mm to several mm, as a material of the coil; however it may be a wire of other material if the conductivity thereof is high. Also, the diameter of the coil for transmitting/receiving has a relationship with the transmission distance, and it shows a tendency, i.e., the larger the diameter, the longer the transmission distance extended. Further, a much higher efficiency can be obtained easily, if the diameters of the coils for transmitting/receiving are equal to each other; however, the characteristic of the magnetic resonance method lies in that a relatively high transmission efficiency can be obtained even if the diameters of the coils for transmitting/receiving differ from to a certain degree, because the coupling between the coils is stronger than that in accordance with the conventional electromagnetic induction method.

From this fact, the diameter of each coil may be same or different, and each coil may be a coil in a cylindrical shape or a plane coil in a spiral shape. Further, the plane coil may be formed as a copper pattern on a substrate, or may be formed as the copper pattern on a film-like substrate.

Embodiment 10

Next, explanation will be given on a tenth embodiment of the non-contact power charging (power transmission) system, according to the present invention, by referring to the drawings attached herewith.

Figure 14:
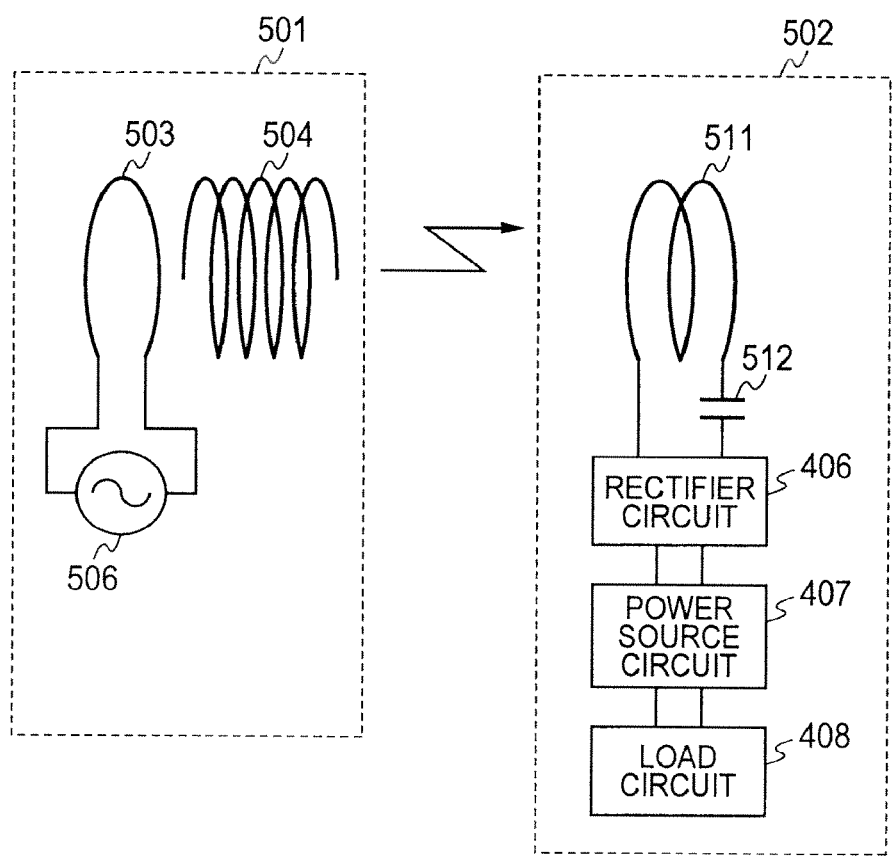
FIG. 14 is a view for showing the configuration of a non-contact power charging system, according to an embodiment 10.

FIG. 14 is a view for showing the tenth embodiment of the non-contact power charging system, to be applied in the present invention.

In the figure, a reference numeral 511 depicts a load coil having resonation, and 512 a resonance capacitor, respectively; however, the other parts than the above, corresponding to those shown in FIG. 13, are attached with the same reference numerals, and therefore explanations thereof will be omitted herein.

In FIG. 14, comparing to the ninth embodiment of the non-contact power charging system shown in FIG. 13, the load coil 511 having resonance and the resonance capacitor 512 are connected with, in series, thereby to form a series resonance circuit, and an inductance value of the load coil 511 having resonance and a capacitance value of the resonance capacitor 512 are so determined that the resonating frequency thereof comes to be equal to the self-resonating frequency of the primary resonance coil 504. Also, the inductance value of the load coil 511 having resonance is determined to be larger than the inductance value of the power supply coil 503.

With applying such the structure as was mentioned above, in addition to obtaining the effect (s) similar to that in the ninth embodiment shown in FIG. 13, since the resonance circuit is constructed with the load coil 511 having resonance and the resonance capacitor 512, it coupled with the magnetic flux from the primary resonance coil 504, and therefore, it is possible to lessen decrease of the transmission efficiency, when the coils are separated in the distance therebetween, much more. In other words, since the change of the impedance is small if the distance between the coils fluctuates, it is possible to lessen the fluctuation in the frequency characteristics depending on the distance between the coils.

Since the transmission distance can be obtained, for example, several cm in case where the coil has the diameter of several cm, approximately, and from several tens cm to 1 m in case where the coil has the diameter of several tens cm, approximately, therefore, comparing to that from 1 cm to 2 cm, approximately, with the conventional electromagnetic induction method, it is possible to obtain a relatively long transmission distance.

Embodiment 11

Figure 15:
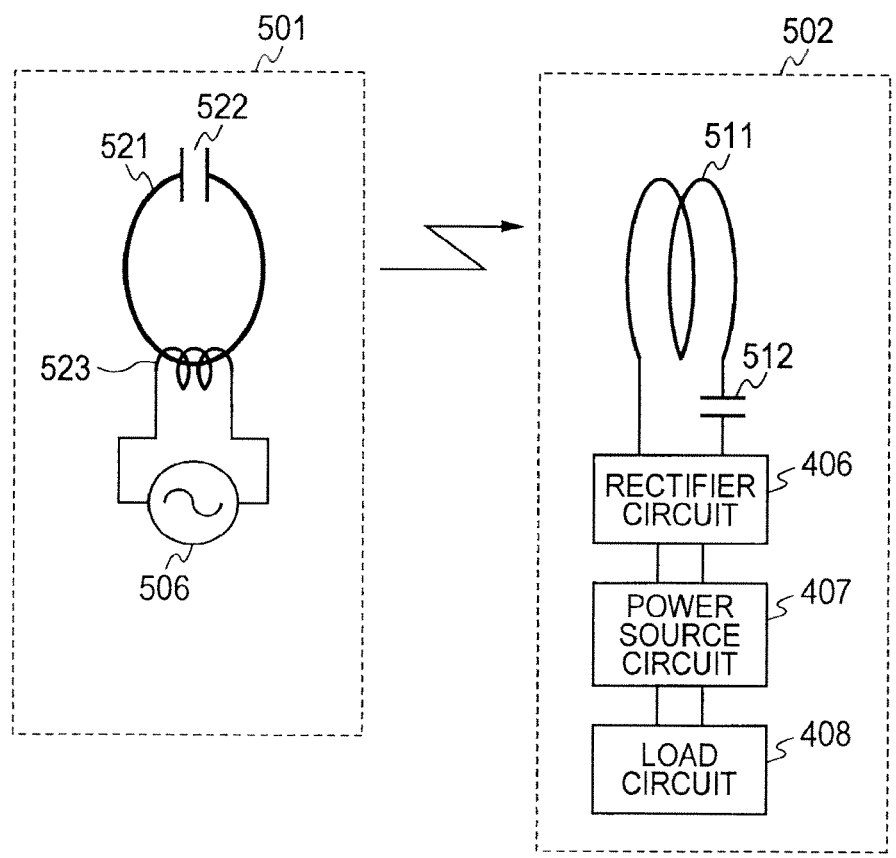
FIG. 15 is a view for showing the configuration of a non-contact power charging system, according to an embodiment 11.

FIG. 15 is a view for showing an eleventh embodiment of the non-contact power charging system, to be applied in the present invention.

In the figure, a reference numeral 521 depicts a primary resonance coil, 522 a resonance capacitor and 523 an exciting coil, respectively; however, the other parts than the above, corresponding to those shown in FIG. 14, are attached with the same reference numerals, and therefore explanations thereof will be omitted herein.

In the figure, when a signal having the resonating frequency equal to that, which is determined by the inductance value of the primary resonance coil 521 and the capacitance of the resonance capacitor 522, is supplied from the high-frequency power source 506 through the exciting coil 523, the resonating phenomenon is generates by the resonance coil 521 and the resonance capacitor 522, and large current flows and generates a strong magnetic field. This configuration mainly applied into an electric power transmission of 10 W or higher than that, and if showing an general example of the size and the number of turns of the coils, the diameter of the resonance coil 521 is from several tens cm to 1 m, approximately, a wire diameter of the coil is about 1 cm, and the number of turns is from 1 to 2 turns, approximately. Also, the wire diameter of the exciting coil is several mm, approximately, and it is common to apply a method of exciting by winding it around the resonance coil 521 by several turns or by using a magnetic body, such as, ferrite core, etc.

In FIG. 15, comparing to the tenth embodiment of the non-contact power transmission system shown in FIG. 14, the electric power is supplied by exciting the primary resonance coil through a local electromagnetic induction, with applying the excitation coil 523 in the place of the power supply coil, and therefore it is possible to achieve small-sizing of the transmitter side since the resonance coil of the transmitter side can be constructed by only one (1) turn, approximately, in addition to obtain the similar effect(s) to that of the tenth embodiment.

Embodiment 12

Figure 16A:
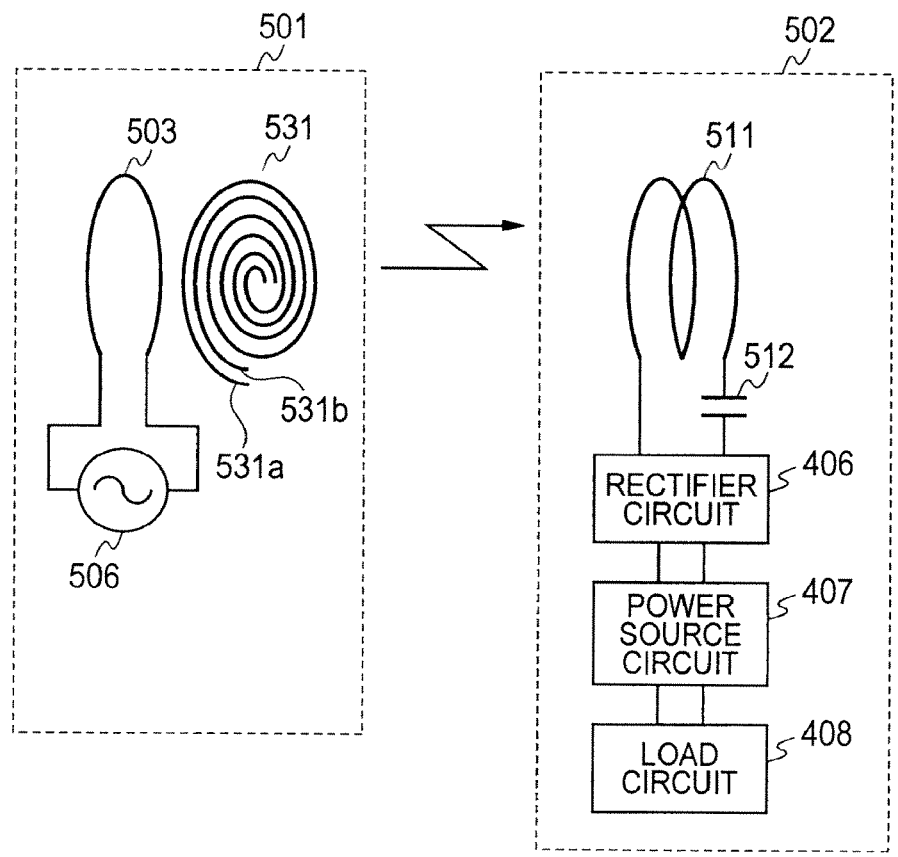
FIG. 16A is a view for showing the configuration of a non-contact power charging system, according to an embodiment 12.

FIG. 16A is a view for showing a twelfth embodiment having the non-contact power charging (power transmission) system, to be applied in the present invention.

In the figure, a reference numeral 531 depicts a group of resonance coils, including spiral-shaped resonance coils 531a and 531b, and they are wound round in a spiral manner, in parallel with, at a constant distance therebetween. Herein, the spiral-shaped resonance coils 531a and 531b are so constructed that they have the self-resonating frequencies different from each other; however, the other parts than the above, corresponding to those shown in FIG. 14, are attached with the same reference numerals, and therefore explanations thereof will be omitted herein.

In FIG. 16A, the numbers of turns of the spiral-shaped resonance coils 531a and 531b are so adjusted that each shows the efficiency at the most at the distance different from each other. If assuming that the distance is "a", at which the spiral-shaped resonance coil 531a shows the efficiency at the most, while the distance is "b", at which the spiral-shaped resonance coil 531b shows the efficiency at the most, when the distance of the load coil 511 having the resonance with the primary resonance coil 531 is "a", the electric power to be supplied from the power supply coil 503 is mainly supplied to the load coil 511 having the resonance through the spiral-shaped resonance coil 531a, on the other hand, the spiral-shaped resonance coil 531b transmits almost no electric power because of shifting of an impedance consistency from the most suitable value thereof. Also when the distance of the load coil 511 having the resonance with the primary resonance coil 531 is "b", the electric power to be supplied from the power supply coil 503 is mainly supplied to the load coil 511 having the resonance through the spiral-shaped resonance coil 531b.

However, the spiral-shaped resonance coils 531a and 531b are able to change the self-resonating frequencies thereof, respectively, by chaining the length of the wire (or the number of turns) and/or the diameter of the wire thereof.

In this instance, since the parasitic capacitance between the coils, due to the fact that the resonance coils thereof are wound round, in parallel with, also receives an influence of coupling with each other, in addition to the influences of the power transmission coil and the load coil, it is necessary to obtain the self-resonating frequency through simulation or experiment.

With applying such the structure as was mentioned above, in addition to obtaining the effect (s) similar to that in the tenth embodiment shown in FIG. 14, it is possible to lessen the fluctuation of the frequency characteristics, due to the distance between the coils, i.e., the primary resonance coil 531 and the load coil 511 having the resonance, to be small much more, on the side of the power transmitter.

Figure 16B:
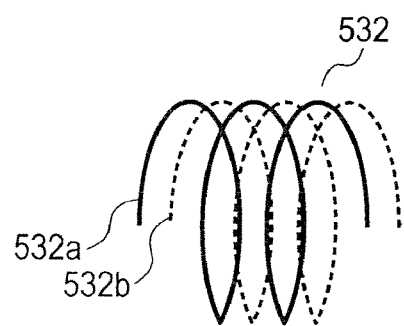
FIG. 16B is a view for showing other example of a group of resonance coils on a primary side in the non-contact power charging system, according to the embodiment 12.

Also, FIG. 16B shows another example of the group 531 of resonance coils on the primary side.

In the figure, a reference numeral 532 depicts a group of cylindrical-shaped resonance coils, and is built up with resonance coils 532a and 532b, and those are wound round in the cylindrical-shape at a constant distance therebetween, in parallel with, wherein they differ in the self-resonating frequency thereof from each other. However, it is possible to change the self-resonating frequencies of those, by changing the length of the wire (or, the number of turns), the wire diameter of coil and/or an inner diameter of the coil of the cylindrical-shaped resonance coils 532a and 532b.

In those figures, the group of coils is made up with two (2) pieces of coils, but may be three (3) or more than that, and if the electric power can be transmitted by the power supply coil, those may be not wound round, but are independent, respectively, or one of those may be a plane coil while the other is the cylindrical-shaped coil.

Figure 22:
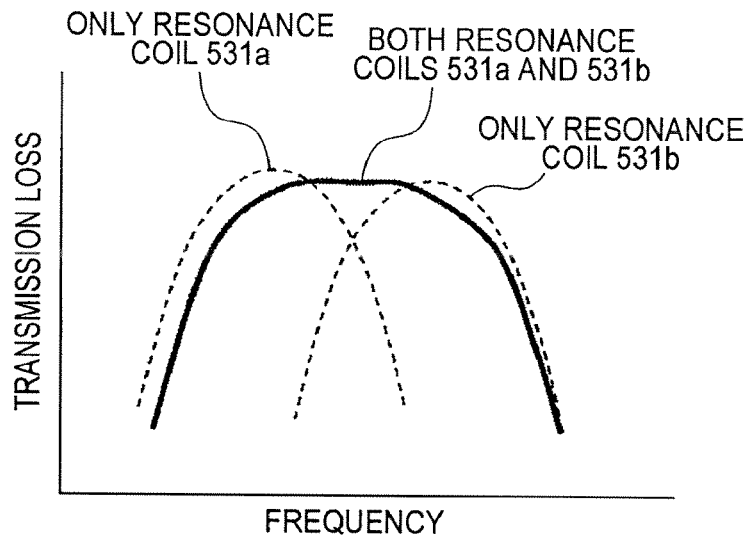
FIG. 22 is a view for showing frequency characteristics of the non-contact power charging system, according to the embodiment 12.

In FIG. 22 is shown the frequency characteristics between the transmitting and receiving coils, when applying those resonance coils mentioned above therein. The figure shows a graph for showing the transmission characteristics from the primary power supply coil to the secondary load coil when the primary resonance coil is made up with plural numbers of coils, each differs from in the self-resonating frequency thereof. The horizontal axis in the figure presents the frequency, while the vertical axis the transmission loss. In the figure, it is possible to see that the frequency characteristics are widened, by applying the coils differing from each other, in the self-resonating frequency thereof, as the resonance coils. With this, it is possible to make a lowering of the transmission efficiency due to widening of the frequency band, even when the frequency characteristics are changed depending on the distance between the coils.

Embodiment 13

Figure 17:
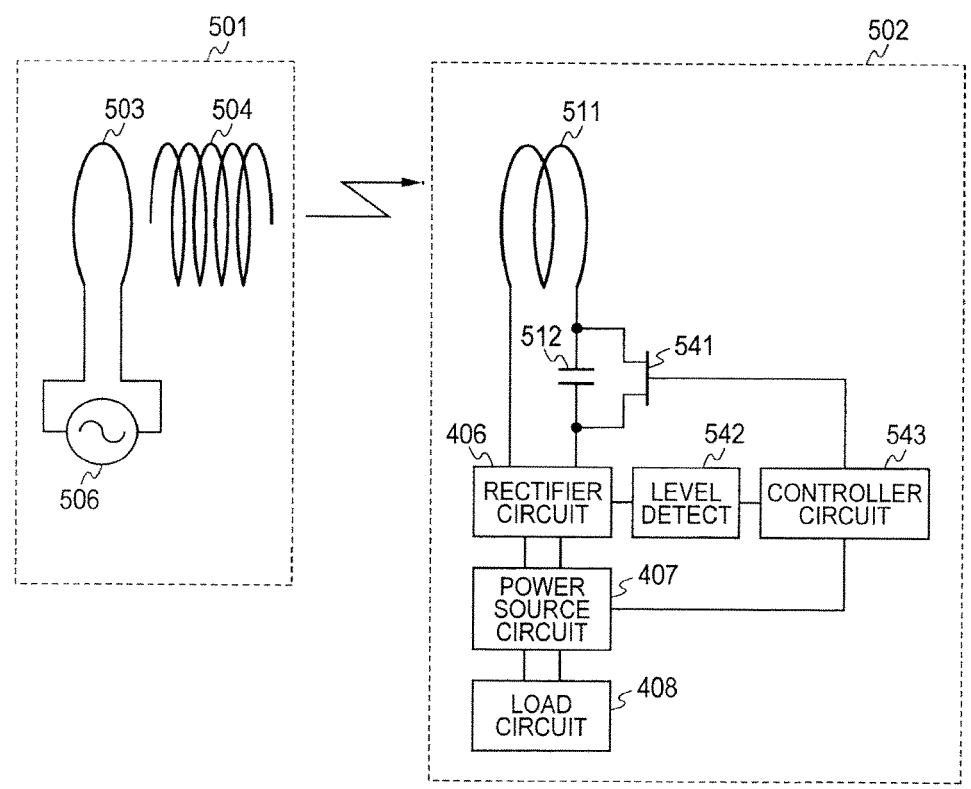
FIG. 17 is a view for showing the configuration of a non-contact power charging system, according to an embodiment 13.

FIG. 17 is a view for showing a thirteenth embodiment of the non-contact power charging (power transmission) system, to be applied in the present invention.

In the figure, a reference numeral 542 depicts a level detector circuit, 543 a controller circuit, 541 a field effect transistor (FET), respectively; however, the other parts than the above, corresponding to those of the tenth embodiment of the power transmission system shown in FIG. 14, are attached with the same reference numerals, and therefore explanations thereof will be omitted herein.

In the figure, comparing to the tenth embodiment shown in FIG. 14, between both end of the resonance capacitor 512 are connected the drain and the source of the field effect transistor 541. Further, a part of the DC output, which is rectified in the rectifier circuit 406 is detected by the level detector 542, to be outputted to the controller circuit 543, and at the same time, the controller circuit 543 controls the gate of the field effect transistor 541 with using a part of the power source voltage, which is rectified from the power source circuit 407, in the structure thereof.

In such the structure as was mentioned above, when the condition that the field effect transistor 541 is under OFF condition, the magnetic field generated by the primary resonance coil 504 couples with the resonance circuit, which is built up with the load coil 511 having the resonance and the resonance capacitor 512, strongly, and then receiving current flows in the rectifier circuit 406 through those resonance circuits. In this instance, when the controller circuit 543 turns the field effect transistor 541 into ON condition, since the resonance capacitor 512 is in the condition of being shorten between the both ends thereof, there is no resonating point for the load coil 511 having the resonance. For this reason, the magnetic field generating by the primary resonance coil 504 supplies the electric power received to the rectifier circuit 406 by the load coil 511, through the electromagnetic induction, which accompanies no resonance on the secondary side. The controller circuit 543 turns the field effect transistor 541 into ON/OFF, periodically, so as to compare the rectified voltage outputted from the rectifier circuit 406, thereby conducting an operation of switching to the much higher one of the electric power received.

In receiving the electric power under the condition of resonation by the load coil 511 and the resonance capacitor 512, the transmission efficiency comes to be highest when the primary resonance coil 504 and the load coil 511 are separated by distance of a certain degree; reversely, when the distance between the coils is very close, such as, equal to several mm or less than that, the transmission efficiency is rather lowered, due to the fluctuation of the impedance. On the other hand, in receiving the electric power only by the load coil 511, since the receiving side has no resonance circuit and the transmission is made through the electromagnetic induction at the very close distance, then the transmission efficiency is high when the receiving side has no resonance circuit. This is because it is possible to consider that the coupling between the power supply coil and the resonance coil and the coupling between the resonance coil and the load coil are same transmissions through the electromagnetic induction. For this reason, when the coils are separated by the distance in a certain degree, with applying the structure of having no resonance circuit on the receiving side, by turning the field effect transistor into OFF condition, when the coils are separated by the certain distance between them, while turning the field effect transistor into ON, when they are very close to, it is possible to obtain the non-contact power transmission system having less deterioration of the transmission efficiency even when the distance between the coils is very close, in addition to the effect(s) similar to that of the tenth embodiment shown in FIG. 14.

Figure 23:
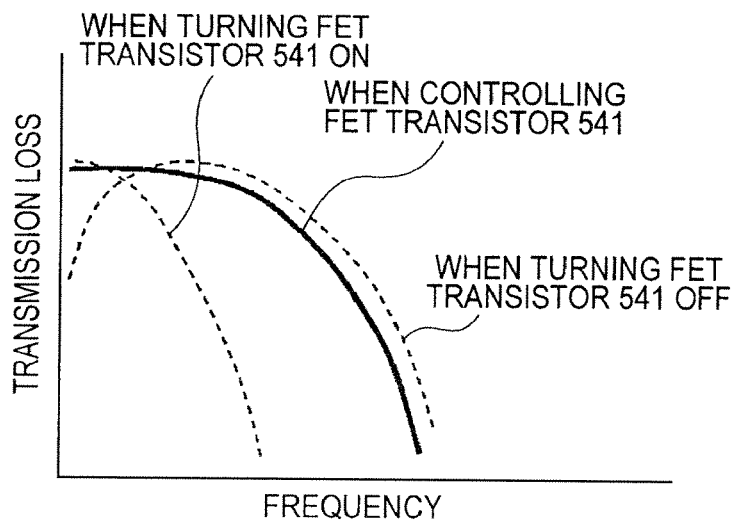
FIG. 23 is a view for showing frequency characteristics of the non-contact power charging system, according to the embodiment 13.
Figure 24:
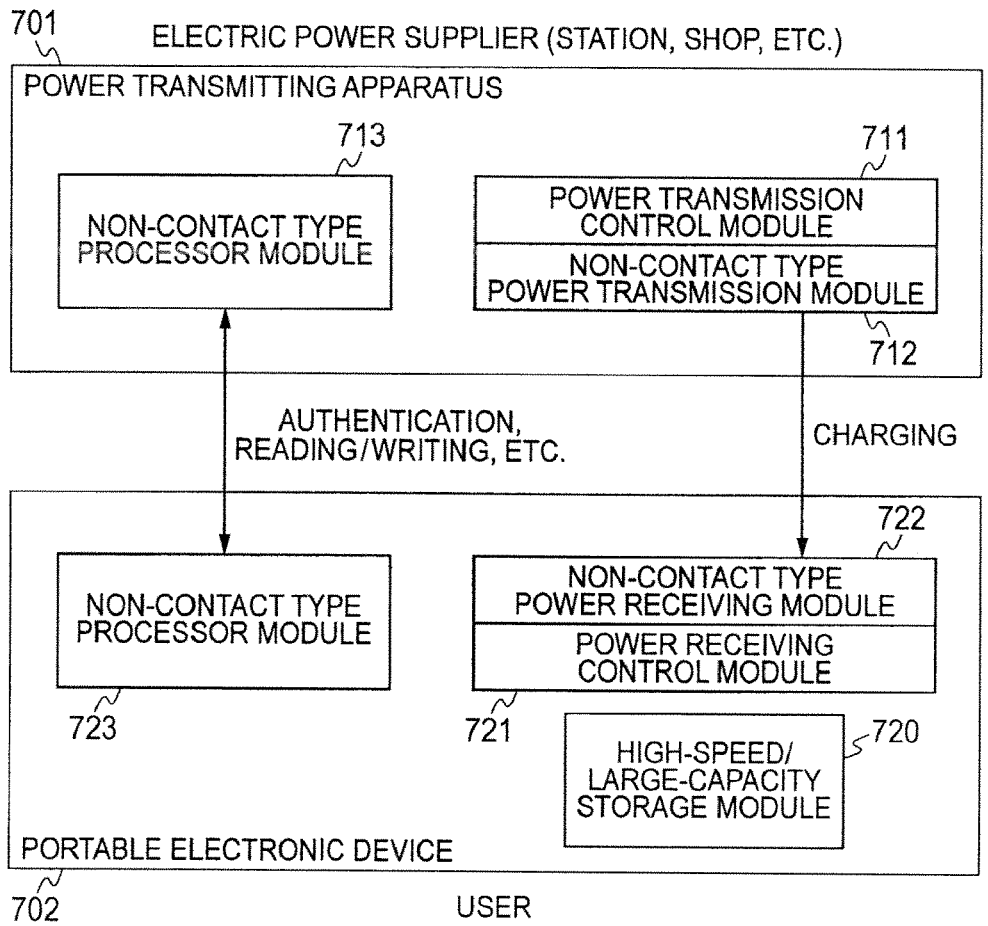
FIG. 24 is a block diagram for showing the conventional example when conducting non-contact communication and non-contact power transmission.

Also, in FIG. 23 is shown a graph for showing an effect (s) of turning the resonance capacitor into ON/OFF, which is connected with the load coil in series, by means of the field effect transistor. The horizontal axis in the figure presents the distance between the coils and the vertical axis presents the transmission loss. In the figure, when the field effect transistor is turned into ON condition, since the load coil has no resonating frequency and the transmission is done through the electromagnetic induction, then the loss increases abruptly when the distance between the coils come to be large. On the other hand, when the field effect transistor is turned into OFF condition, since the load coil makes up the series resonance circuit with the resonance capacitor, then the increase of the transmission loss is small even if the coils are separated by the certain degree of distance therebetween, but rather the transmission efficiency is lowered if the distance between them is very close. For this reason, it can be seen that the transmission efficiency can be prevented or suppressed from being lowered down by making the load coil to have no resonance circuit with brining the field effect transistor into ON condition when the distance is very close to.

Embodiment 14

Figure 18:
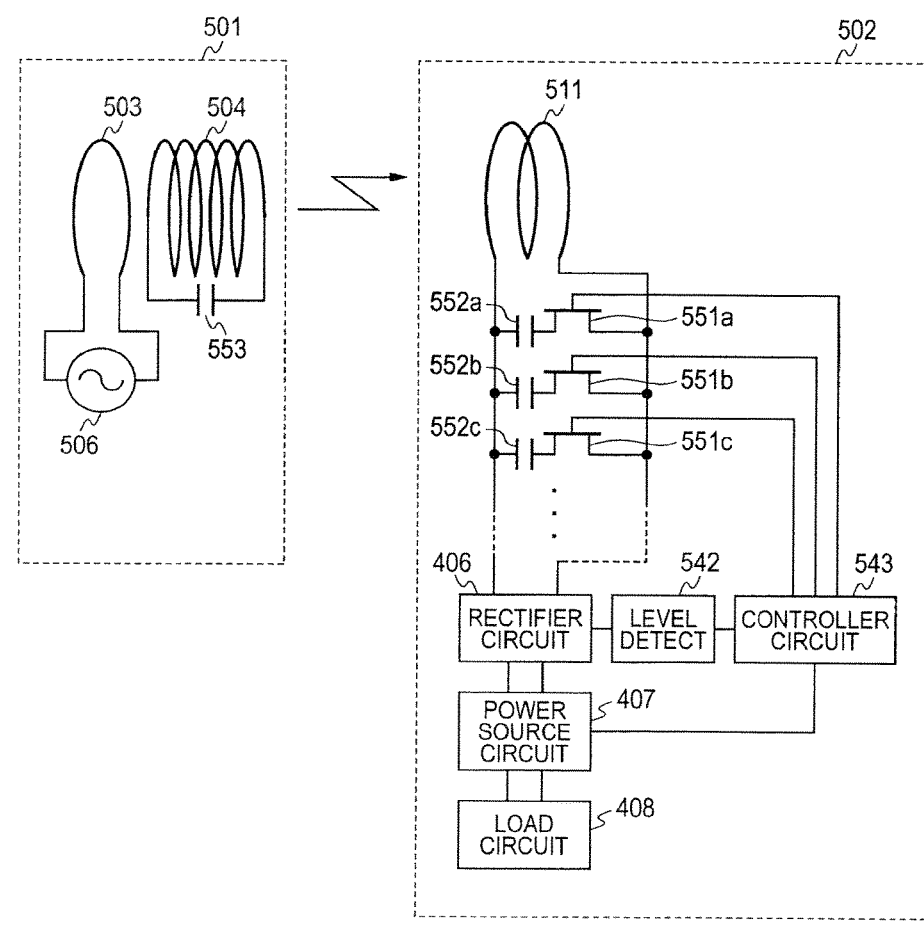
FIG. 18 is a view for showing the configuration of a non-contact power charging system, according to an embodiment 14.

FIG. 18 is a view for showing a fourteenth embodiment having the non-contact power charging (power transmission) system, to be applied in the present invention.

In the figure, reference numerals 551a, 551b and 551c depict field effect transistors, 552a, 552b and 552c resonance capacitors, and 553 a resonance capacitor, respectively; however, the other parts than the above, corresponding to those of the thirteenth embodiment shown in FIG. 17, are attached with the same reference numerals, and therefore explanations thereof will be omitted herein.

In the figure, comparing to the thirteenth embodiment shown in FIG. 17, the resonance capacitor 553 is connected in parallel with the primary resonance capacitor, and with the load coil 511 having the resonance are connected those, respectively, each connecting the field effect transistors 551a, 551b and 551c, and the resonance capacitors 552a, 552b and 552c, in series.

From the power supply coil 503 is mainly supplied the electric power at the self-resonating frequency, which is determined by the inductance value of the primary resonance coil 504 and the resonance capacitance of the resonance capacitor 553. Since the primary resonance coil 504 is supplied with the electricity at the self-resonating frequency determined with the resonance capacitor 553, large current flows in those resonance circuit, and generates a strong magnetic field. In this instance, since the resonance capacitor 553 is connected with the primary resonance coil 504, in parallel, therefore, comparing to the case where there is no capacitor, comparing it at the same resonating frequency, the inductance value of the primary resonance coil 504 can be made small, and therefore, it is possible to make the configuration of the transmitter 501 small.

On the other hand, the resonance capacitors 552a, 552b and 552c, which are connected with the field effect transistors 551a, 551b and 551c, build up the resonance circuits, respectively, with the load coil 551, in parallel, and at the same time, the respective capacitors have such capacitance that each differs from in the resonating frequency thereof. For this reason, they are in such the structure for selecting the capacitance value to bring the transmission efficiency up to the highest, depending on the distance of the coils, i.e., between the primary resonance coil 504 and the load coil 511.

In such structure as was mentioned above, explanation will be given on an example of means for selecting the most suitable capacitance value, hereinafter.

When receiving the magnetic field from the primary resonance coil 504 by the load coil 551 having the resonance, the controller circuit 543 turns the field effect transistor into ON condition, corresponding to the resonance capacitance, on which the transmission efficiency comes to be high when the distance between the coils is farthest, in advance. And when beginning to receive the electric power, the controller circuit 543 turns the other field effect transistor into ON condition, which is in OFF condition, periodically, to detect the electric power received at that time by the level detector circuit 542. And, selecting the resonance capacitor, on which the electric power received is the largest enables to receive the electricity at the high transmission efficiency. In this instance, the controller circuit 543 detects the electric power received, periodically, by the level detector circuit 542, and it selects the field effect transistor, at which the transmission efficiency is the highest, to turn it into ON condition.

With such structure as was mentioned above, in addition to obtaining the similar effect(s) to that of the thirteenth embodiment shown in FIG. 17, it enables further optimization of the transmission efficiency the electric power depending on the distance between the coils, with provision of plural numbers of resonance capacitors and by exchanging them with using the field effect transistors.

When the distance between the coils is close (i.e., equal to or less than 1 cm, approximately, in case of the coil having the diameter of several cm), since the parasitic capacitance exists even between the wound wire of the resonance coil 504 and the wound wire of the load coil 511, the capacitance between the resonance coil and the load coil increases, and thereby the self-resonating frequency of the resonance coil also is lowered down. In this instance, if the transmitting frequency is constant, since the self-resonating frequency of the resonance coil can be prevented from being lowered down, with an increase of the resonating frequency between the load coil and the resonance capacitor by bringing the resonance capacitance of the load coil to be small, on the contrary, as the distance comes to be close.

Embodiment 15

Figure 19:
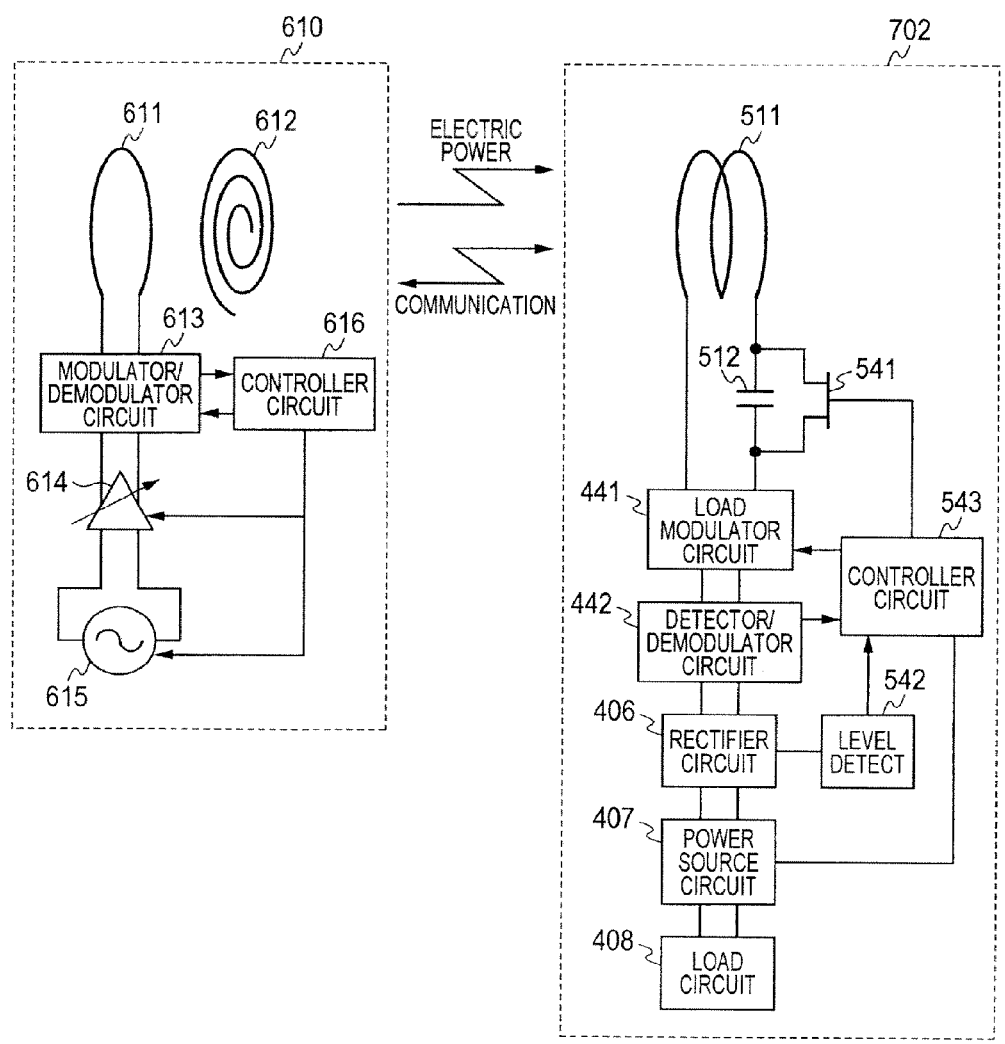
FIG. 19 is a view for showing the configuration of a non-contact power charging system, according to an embodiment 15.

FIG. 19 is a view for showing a fifteenth embodiment having the non-contact power charging (power transmission) system, to be applied in the present invention.

In the figure, a power transmitting apparatus 610 is constructed with a power supply coil 611, a spiral-shaped primary resonance coil 612, a modulator/demodulator circuit 613, a variable gain power amplifier 614, an oscillator 615 and a controller circuit 616; however, the other parts than the above, corresponding to those of the thirteenth embodiment shown in FIG. 17, are attached with the same reference numerals, and therefore explanations thereof will be omitted herein.

The spiral-shaped primary resonance coil 612 shown in the figure is a coil wound on a plane, and there is also the self-resonating frequency due to the parasitic capacitance between wound wires of the coil, similar to the cylindrical-shaped cubit coil, and the resonating frequency thereof can be obtained in the similar manner to that of the cylindrical-shaped coil.

Also, onto the portable terminal device 702 are added the load modulator circuit 411 and the detector/demodulator circuit 442 between the load coil 511 having the resonance and the rectifier circuit 406, wherein the power transmitting apparatus 610 is connected with the high-frequency power source through the variable gain power amplifier 614 and the modulator/demodulator circuit 613.

With such configuration as was mentioned above, the non-contact transmission of the electric power is conducted from the power transmitting apparatus 610 to the portable terminal device 702, as well as, it has a communication means, being necessary for conducting authentication between the power transmitting apparatus 610 and the portable terminal device 702, which is needed when conducting the power transmission, and for conducting the control on the power transmission.

First of all, explanation will be given on an operation of transmitting the electric power with non-contact from the power transmitting apparatus 610 of the portable terminal device 702.

A signal outputted from the high-frequency power source 615 at the frequency equal to the self-resonating frequency of the primary resonance coil 612 is amplified within the variable gain power amplifier 614, and is supplied to the power supply coil 611 through the modulator/demodulator circuit 613. The power transmission signal supplied has the frequency equal to that of the self-resonating frequency of the primary resonance coil 612, therefore from the primary resonance coil 612 is generated a string magnetic field.

On the other hand, since the power supply coil 511 having the resonance coupled with the magnetic field generated from the primary resonance coil 612, due to the resonance with the resonance capacitor 512, it receives the electric power, effectively, and supplies the electric power to the load circuit 408 through the power source circuit 407, after rectifying it within the rectifier circuit 406 through the detector/modulator circuit 442. Also, the controller circuit 543 executes an operation of exchanging the electric power received to the larger one, by turning the field effect transistor 541 into ON or OFF, by referring to the value of the level detector circuit 542.

Next, explanation will be given on the operation of conducting the communication with non-contact, firstly in the case where the data is transmitted from the power transmitting apparatus 610 to the portable terminal device 702.

In the figure, the signal transmitted from the variable gain power amplifier 614 is made the modulation thereon, such as, an ASK modulation, etc., to be supplied to the power supply coil 611. The power transmission signal supplied thereto generates the magnetic field stronger than that generated by the primary resonance coil 612, and is received, effectively, by the load coil 511 having the resonance and the resonance capacitor 512, and then it is inputted into the detector/modulator circuit 442 through the load modulator circuit 441. Also, the electric power received is rectified within the rectifier circuit 406, and is supplied to the load circuit 408 by the power source circuit 407.

Next, explanation will be given on the case when the data is transmitted from the portable terminal device 702 to the power receiving apparatus 610.

Since the portable terminal device 702 receives the electric power from the power transmitting apparatus 610 when executing the communication, signal amplitude is always applied to the load modulator circuit 441. For this reason, in the load modulator circuit 441, if changing the impedance at this point corresponding to the modulation signal, then the impedance on the side of the power transmitting apparatus 610, magnetically coupling with, also receives the influence and changes (i.e., a load modulation method). Accordingly, since a signal can be taken out within the modulator/demodulator circuit 613, through diode detection, etc., being demodulated upon reflection of the electric power transmitted, which the power transmission signal generates upon the load fluctuation of the load modulation circuit 441, then the communication can be made.

With such configuration as was mentioned above, in addition to obtaining the similar effect(s) to that of the thirteenth embodiment of the non-contact power transmission system shown in FIG. 17, there can be obtained the non-contact power transmission system having the communication means enabling the communication with such simple structure.

Embodiment 16

Figure 20:
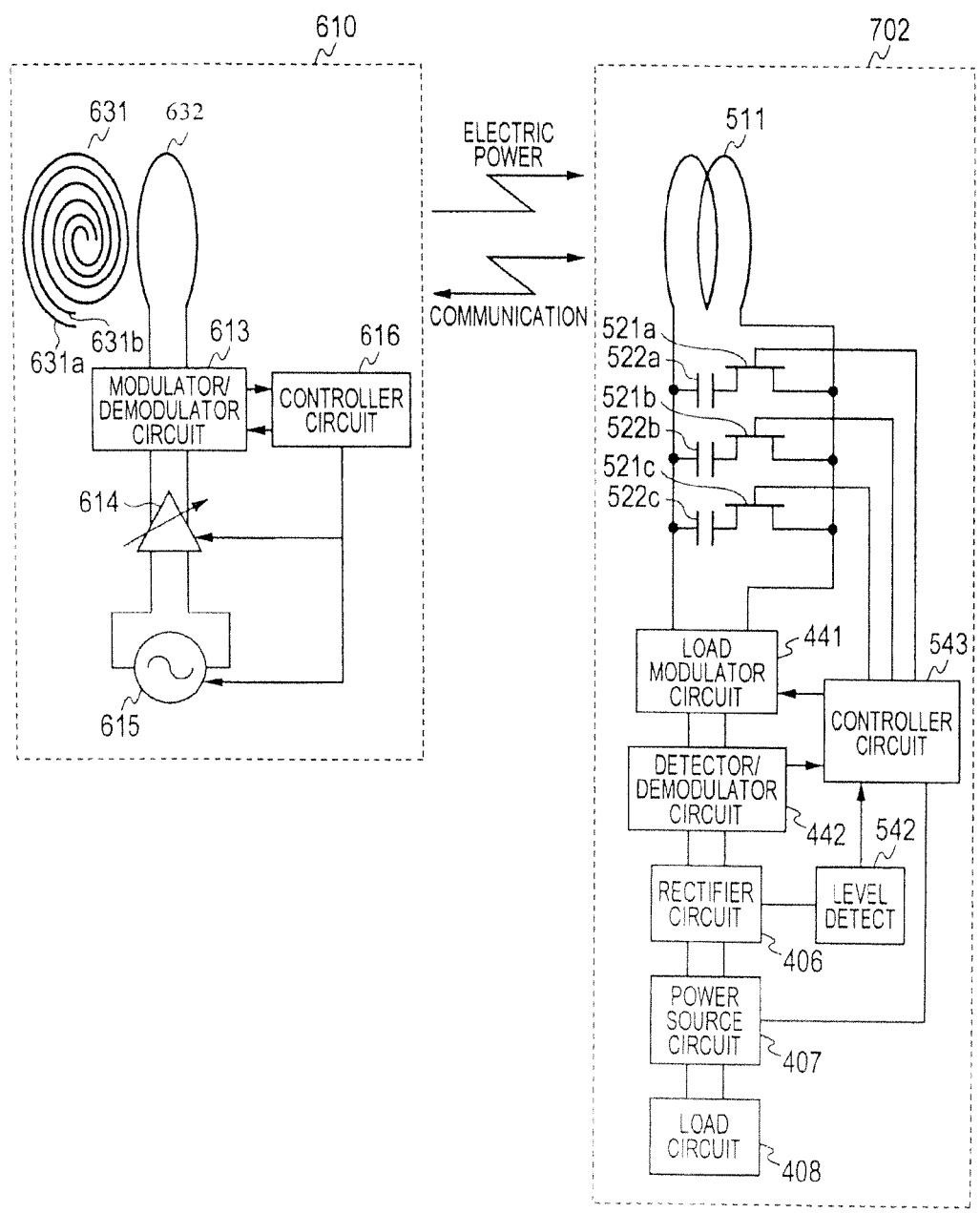
FIG. 20 is a view for showing the configuration of a non-contact power charging system, according to an embodiment 16.

FIG. 20 is a view for showing a sixteenth embodiment having the non-contact power charging (power transmission) system, to be applied in the present invention.

In the figure, a reference numeral depicts a group of primary resonance coils, 632 a power supply coil, wherein the group 631 of primary resonance coils is constructed with spiral-shaped resonance coils 631a and 631b, and those are wound round in a spiral manner, at a predetermined distance, in parallel with; however, the other parts than the above, corresponding to those of the fourteenth embodiment shown in FIG. 18 and the fifteenth embodiment shown in FIG. 19, are attached with the same reference numerals, and therefore explanations thereof will be omitted herein.

In the figure, as the primary resonance coil of the power transmitting apparatus 610 are applied the plural numbers of coils, e.g., the spiral-shaped resonance coils 631a and 631b, and also each coil has the structure of changing the number of turns, so that it differs from each other in the self-resonating frequency thereof. Further, the positional structures between the group 631 of the primary resonance coils and the power supply coil 632 is also changed, i.e., the distance between the power supply coil 632 and the load coil 511 having the resonance is closer than the distance between the group 631 of the primary resonance coils 631 and the load coil 511 having the resonance.

With such configuration as was mentioned above, in addition to obtaining the similar effect(s) of the twelfth embodiment of the non-contact power transmission system shown in FIG. 16A, of the fourteenth embodiment of the non-contact power transmission system shown in FIG. 18 and of the fifteenth embodiment of the non-contact power transmission system shown in FIG. 19, since it is possible to transmit the electric power from the power supply coil 632 to the load coil 511 having the resonance, directly, through the electromagnetic induction, rather than the magnetic resonance transmission through the group 613 of the primary resonance coils, when the distance between the coils is very close, i.e., between the power supply coil 632 and the load coil 511 having the resonance, by bringing the distance between the power supply coil 632 and the load coil 511 having the resonance to be closer than the distance between the group 631 of the primary resonance coils and the load coil 511 having the resonance, therefore it is possible to prevent the transmission efficiency from being lowered down at the very close distance.

With such configuration as was mentioned above, when the distance between the coils comes to be close to, since the resonating frequency is lowered down due to an increase of the resonating frequency of the resonance coil accompanying with an approach of the load coil, in particular, an equivalent parasitic capacitance thereof, then the transmission efficiency is lowered down when the power transmission frequency is constant. In this case, if changing the dispositions of the resonance coil and the power supply coil, the distance between the power supply coil and the load coil comes to be close and also the resonance coil does not enter between those, then the coupling between the power supply coil and the load coil through the electromagnetic induction becomes strong. In this instance, although the transmission through the electromagnetic induction is small when the distance between the coils is far, however when the distance between the coils is very close, although the resonating frequency is shifted to a lower portion, but the transmission between the power supply coil and the load coil through the electromagnetic induction comes to be large, and therefore it is possible to prevent the transmission efficiency from being lowered down when the distance between the coils is very close.

Embodiment 17

Figure 21:
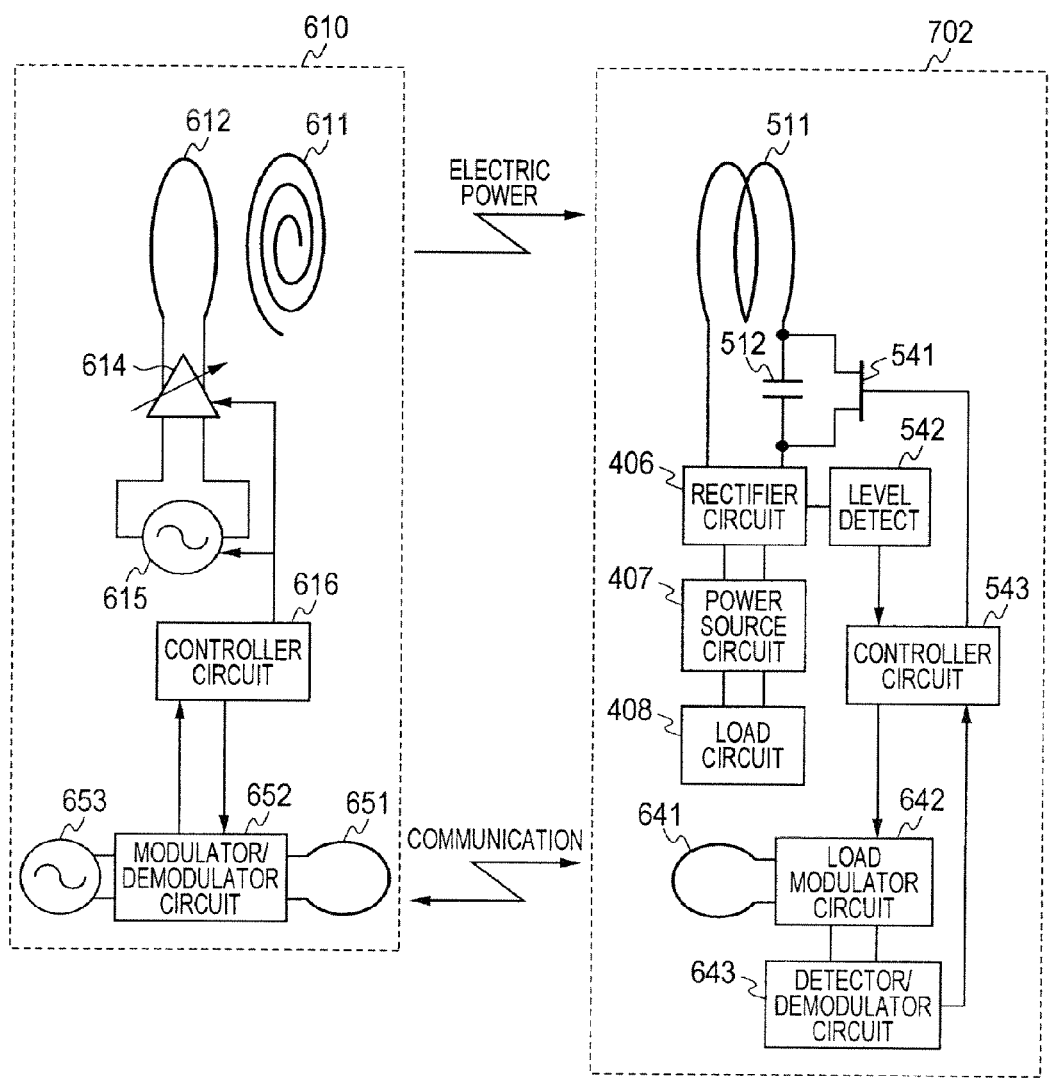
FIG. 21 is a view for showing the configuration of a non-contact power charging system, according to an embodiment 17.

FIG. 21 is a view for showing a seventeenth embodiment having the non-contact power charging (power transmission) system, to be applied in the present invention.

In the figure, reference numerals 641 and 651 depict antennas, 642 a load modulator circuit, 643 a detector/demodulator circuit, 652 a modulator/demodulator circuit, and 653 an oscillator, respectively; however, the other parts than the above, corresponding to those of the fifteenth embodiment shown in FIG. 19, are attached with the same reference numerals, and therefore explanations thereof will be omitted herein.

In the power transmitting apparatus 610, the oscillator circuit 653 is connected with the antenna 651 through the modulator/demodulator circuit 652, while in the portable terminal device 702 is connected the antenna 641 with the detector/demodulator circuit 643 through the load modulator circuit 642.

Within such the configuration as was mentioned above, explanation will be given on the operation of executing the communication between the power transmitting apparatus 610 and the portable terminal device 702. However, the operation of transmitting the electric power will be omitted herein.

In the figure, the transmission signal from the oscillator circuit 653, after being conducted the modulation thereon, such as, ASK modulation, etc., within the modulator/demodulator circuit 652, is supplied to the antenna 651. The transmission signal supplied is radiated by the antenna in the form of electromagnetic waves or magnetic energies. The transmission signal radiated is received by the antenna 641, and is inputted to the detector/demodulator circuit 643 through the load modulator circuit 642. The transmission signal inputted is demodulated within the detector circuit of a diode detector or the like, and inputted into the controller circuit 604.

Next, explanation will be given on the case where data is transmitted from the portable terminal device 702 to the power transmitting apparatus 610. By taking the case where the communication is executed under the condition that the portable terminal device 702 receives the signal from the power transmitting apparatus 610 into the consideration, the signal amplitude is also always applied onto the load modulator circuit 642. For this reason, the load modulator circuit 642 is in such configuration that is applies a method therein that the modulation is conducted by fluctuating the load at this point.

With such the configuration as mentioned above, since the communication can be made at the frequency differing from that of the power transmission, in addition to the similar effect(s) to that of the fifteenth embodiment of the non-contact power transmission system shown in FIG. 19, therefore it is possible to conduct the communication with a speed, being higher much more, and therefor it is also possible to transmit data other than the control data, which are necessary for the authentication and the power transmission, such as the power transmission control, etc.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A non-contact power transmission system, comprising:
   a non-contact power transmitting apparatus for conducting non-contact transmission of an electric power to a power receiving apparatus;
   a first non-contact communication apparatus for conducting non-contact transmission of data for authentication and/or or reading/writing of data; and
   a power receiving apparatus, including a second non-contact communication apparatus for conducting communication between said first non-contact communication apparatus, and a power receiving unit for receiving the electric power transmitted from said non-contact power transmitting apparatus, and sharing an antenna coil for conducting the non-contact communication and for receiving the electric power transmitted from said power transmitting apparatus, in common, wherein
   the power receiving unit of said power receiving apparatus includes:
   a power receiving coil,
   a first resonance circuit connected with the power receiving coil, a second resonance circuit connected to the first resonance circuit through a first filter circuit,
a rectifying circuit, connected to the second resonance circuit, rectifying the electric power,
said second non-contact communication apparatus includes a load coil magnetically coupled to the power receiving coil, to provide said load coil with a modulator/demodulator circuit for communicating with said first non-contact communication apparatus through a second filter circuit,
said first resonance circuit has a capacitor that resonates with an inductance value of said power receiving coil at a first signal frequency for conducting the non-contact communication,
said second resonance circuit has a capacitor that resonates with said power receiving coil at a second signal frequency for conducting the non-contact transmission of the electric power, and
said first filter circuit passes therethrough the second signal frequency, while attenuating the first signal frequency, and said second filter circuit passes therethrough the first signal frequency, while blocking the second signal frequency.

2. The non-contact power transmission system of claim 1, wherein
the second signal frequency to be transmitted is a frequency lower than a frequency of the signal communicated from said first non-contact communication apparatus, in the structure thereof,
the first filter circuit includes a low-pass filter, and
the second filter circuit includes a high-pass filter.

3. The non-contact power transmission system of claim 1, wherein the first non-contact communication apparatus for conducting authentication or reading/writing of data with non-contact is a questioner, while the second non-contact communication apparatus included in said power receiving apparatus is a responder.

4. A non-contact power transmission system, comprising:
a non-contact power transmitting apparatus for conducting non-contact transmission of electric power to a power receiving apparatus; and
a first non-contact communication apparatus for conducting non-contact transmission of data for authentication or reading/writing of data; and
a power receiving apparatus having a second non-contact communication apparatus for conducting non-contact communication between said first non-contact communication apparatus and a power receiving unit for receiving the electric power transmitted from said non-contact power transmitting apparatus, wherein
said second non-contact communication apparatus has a first questioner and a first responder in common in the structure thereof, and if said first non-contact communication apparatus is a second questioner, said second non-contact communication unit turns said first responder into ON condition when receiving a signal from a second questioner, so as to transmit a response data signal responding to a question data signal from the second questioner, and if said first non-contact communication apparatus is a second responder, said second non-contact communication unit turns said first questioner into ON condition, so as to transmit a question data signal to said second responder, and also receives a response data signal from the second responder.

5. A non-contact power receiving apparatus for receiving an electric power, comprising;
a resonance coil and a load coil, magnetically coupling with each other;
a first resonance circuit, coupled to the resonance coil in parallel, for resonating with said resonance coil at a first frequency;
a second resonance circuit, coupled to the resonance coil through a filter, for resonating at a second frequency; and
a first output terminal coupled to the second resonance circuit, wherein;
the filter passes a signal of the second frequency therethrough but attenuates a signal of the first frequency,
the first output terminal outputs the signal of the second frequency passed through the filter, and
the load coil receives the signal of the first frequency through magnetic coupling with the resonance coil.

6. A non-contact power transmitting apparatus for transmitting an electric power, comprising;
a resonance coil and a power supply coil, magnetically coupling with each other;
a first resonance circuit, coupled to the resonance coil in parallel, for resonating with said resonance coil at a first frequency;
a second resonance circuit, coupled to the resonance coil through a filter, for resonating at a second frequency; and
a first input terminal coupled to the second resonance circuit, wherein;
the filter passes a signal of the second frequency therethrough but attenuates a signal of the first frequency,
the first input terminal inputs the signal of the second frequency passed through the filter, and
the power supply coil transmits the signal of the first frequency through magnetic coupling with the resonance coil.

7. The non-contact power transmitting apparatus for transmitting the electric power of claim 6, further comprising;
a non-contact communication apparatus for conducting non-contact transmission of data for authentication or reading/writing of data with the signal of the first frequency.

8. A non-contact power receiving apparatus for receiving an electric power, comprising;
an antenna coil for conducting a non-contact communication and receiving an electric power;
a first resonance circuit, coupled to the antenna coil in parallel, for resonating with the antenna coil at a first frequency;
a second resonance circuit, coupled to the antenna coil in parallel or in series through a first filter, for resonating with the antenna coil at a second frequency;
a power receiving unit coupled to the second resonance circuit;
a load coil magnetically coupled to the antenna coil; and
a non-contact communication unit coupled to the load coil through a second filter, wherein;
the first filter passes a signal of the second frequency therethrough but attenuates a signal of the first frequency,
the power receiving unit receives the signal of the second frequency passing through the first filter, the second filter, coupled to the load coil, passes a signal of the first frequency therethrough but attenuates a signal of the second frequency, and the non-contact communication unit receives the signal of the first frequency passing through the second filter.

9. The non-contact power receiving apparatus of claim 8, wherein the first frequency is a frequency lower than the second frequency, the first filter is a low-pass filter, the second filter is a high-pass filter, and the first resonance circuit and the second resonance circuit are capacitances.

10. The power receiving apparatus of claim 8, wherein the non-contact communication unit has a questioner and a responder in common in the structure thereof, receiving a question data signal and transmitting a response data signal.

11. A power transmitting apparatus, comprising;

a first coil including a power supply coil, an inductance value of which is lower than an inductance of a coil for receiving electric power from the power transmitting apparatus, for supplying an electric power at a certain frequency, and a magnetic resonance coil, an inductance value of which is higher than the inductance of the coil in side of receiving electric power, for resonating at a certain resonance frequency; and a resonance capacitance coupled to the magnetic resonance coil in parallel, wherein the power supply coil supplies the electric power at the certain resonance frequency with the magnetic resonance coil, and excites the magnetic resonance coil, and the magnetic resonance coil transmits the electric power at the certain resonance frequency.

12. A power receiving apparatus of claim 11, further comprising;

a load coil for receiving the electric power at the certain resonance frequency with the magnetic resonance coil, wherein an inductance of the load coil is higher than the inductance of the power supply coil and lower than the inductance of the magnetic resonance coil.

13. The power receiving apparatus of claim 12, further comprising;

a resonance circuit, coupled to the load coil in parallel or in series, for resonating the load coil.

14. The power transmitting apparatus of claim 11, further comprising;

a first modulator/demodulator circuit coupled to the power supply coil, wherein the first coil transmits a modulated signal from the first modulator/demodulator circuit, and the modulated signal is superimposed on the electric power.

15. A power receiving apparatus for receiving the electric power from the power transmitting apparatus of claim 14, comprising;

a load coil for receiving the electric power at the certain resonance frequency and a second modulator/demodulator circuit coupled to the load coil, wherein an inductance of the load coil is higher than the inductance of the power supply coil and lower than the inductance of the magnetic resonance coil, and the load coil receives the modulated signal from the first coil.

16. The power receiving apparatus of claim 15, wherein the load coil communicates with the first coil through a load modulation method.

* * * * *